(12) United States Patent
Jefferies et al.

(10) Patent No.: US 12,172,654 B2
(45) Date of Patent: Dec. 24, 2024

(54) TARGET ALIGNMENT SYSTEM AND METHOD FOR SENSOR CALIBRATION

(71) Applicant: BPG Sales and Technology Investments, LLC, Ada, MI (US)

(72) Inventors: Ryan M. Jefferies, Hudsonville, MI (US); Robert F. Cotter, Grand Rapids, MI (US); Gerry L. Deater, Grant, MI (US); Dylan Kunce, Rockford, MI (US); Landon Potts, Grand Rapids, MI (US); Jack M. Kaback, Grand Rapids, MI (US)

(73) Assignee: BPG Sales and Technology Investments, LLC, Ada, MI (US)

( * ) Notice: Subject to any disclaimer, the term of this patent is extended or adjusted under 35 U.S.C. 154(b) by 277 days.

(21) Appl. No.: 17/587,668

(22) Filed: Jan. 28, 2022

(65) Prior Publication Data
US 2022/0234596 A1   Jul. 28, 2022

Related U.S. Application Data

(60) Provisional application No. 63/142,736, filed on Jan. 28, 2021.

(51) Int. Cl.
*B60W 40/10* (2012.01)
*G06V 20/58* (2022.01)

(52) U.S. Cl.
CPC .............. *B60W 40/10* (2013.01); *G06V 20/58* (2022.01); *B60W 2420/403* (2013.01); *B60W 2554/4041* (2020.02)

(58) Field of Classification Search
CPC ........... B60W 40/10; B60W 2420/403; B60W 2554/4041; B60W 40/12; B60W 50/04; G06V 20/58; G01D 18/00
See application file for complete search history.

(56) References Cited

U.S. PATENT DOCUMENTS 3,288,020 A   11/1966   Lill
3,630,623 A   12/1971   Schirmer
(Continued)

FOREIGN PATENT DOCUMENTS

CN   1764818 A   4/2006
CN   100373129   3/2008
(Continued)

OTHER PUBLICATIONS

International Search Report and Written Opinion of the International Searching Authority from corresponding Patent Cooperation Treaty (PCT) Application No. PCT/IB2022/050776, indicated completed on May 2, 2022.
(Continued)

*Primary Examiner* — Ig T An
(74) *Attorney, Agent, or Firm* — Gardner, Linn, Burkhart & Ondersma LLP

(57) ABSTRACT

A system and method for aligning a target to a vehicle for calibration of a vehicle sensor includes positioning a target adjustment stand relative to a vehicle, where the target stand has a base and a target mount moveably mounted on the target stand with the target mount configured to support a target, and with the target stand including actuators configured to selectively move the target mount relative to the base. The system further includes a pair of distance targets and distance sensors configured for use in measuring the distances between respective ones of aligned distance targets and sensors. The distance sensors and targets are arranged for measuring the distances from the target stand to either side of a vehicle for use in adjusting the position of the target mount. The target mount is vertically and laterally movable on a tower of the target stand, with the tower configured to rotate about a vertical axis.

20 Claims, 16 Drawing Sheets

(56) References Cited

U.S. PATENT DOCUMENTS

| | | |
|---|---|---|
| 3,918,816 A | 11/1975 | Foster et al. |
| 4,249,824 A | 2/1981 | Wiederrich et al. |
| 4,303,338 A | 12/1981 | Morrison et al. |
| 4,337,581 A | 7/1982 | Eck |
| 4,416,065 A | 11/1983 | Hunter |
| 4,444,496 A | 4/1984 | Dale, Jr. |
| 4,639,878 A | 1/1987 | Day et al. |
| 4,647,208 A | 3/1987 | Bieman |
| 4,690,557 A | 9/1987 | Wiklund |
| 4,724,480 A | 2/1988 | Hecker et al. |
| 4,726,122 A | 2/1988 | Andersson |
| 4,863,266 A | 9/1989 | Masuko et al. |
| RE33,144 E | 1/1990 | Hunter et al. |
| 4,899,218 A | 2/1990 | Waldecker et al. |
| 4,931,964 A | 6/1990 | Titsworth et al. |
| 5,018,853 A | 5/1991 | Hechel et al. |
| 5,044,746 A | 9/1991 | Henseli |
| 5,048,954 A | 9/1991 | Madey et al. |
| 5,054,918 A | 10/1991 | Downing et al. |
| 5,140,533 A | 8/1992 | Celette |
| 5,177,558 A | 1/1993 | Hill |
| 5,177,563 A | 1/1993 | Everett et al. |
| 5,198,877 A | 3/1993 | Schulz |
| 5,249,364 A | 10/1993 | Bishop |
| 5,259,246 A | 11/1993 | Stuyts |
| 5,268,731 A | 12/1993 | Fuchiwaki et al. |
| 5,274,433 A | 12/1993 | Madey et al. |
| 5,291,264 A | 3/1994 | Longa et al. |
| 5,489,983 A | 2/1996 | McClenahan et al. |
| 5,519,489 A | 5/1996 | McClenahan et al. |
| 5,532,816 A | 7/1996 | Spann et al. |
| 5,559,695 A | 9/1996 | Daily |
| 5,583,797 A | 12/1996 | Fluegge et al. |
| 5,600,893 A | 2/1997 | Phillips |
| 5,675,408 A | 10/1997 | Samuelsson et al. |
| 5,703,796 A | 12/1997 | Moradi et al. |
| 5,724,129 A | 3/1998 | Matteucci |
| 5,724,743 A | 3/1998 | Jackson |
| 5,731,870 A | 3/1998 | Bartko et al. |
| 5,760,938 A | 6/1998 | Hodge |
| 5,781,286 A | 7/1998 | Knestel |
| 5,812,256 A | 9/1998 | Chapin et al. |
| 5,815,257 A | 9/1998 | Haas |
| 5,818,574 A | 10/1998 | Jones et al. |
| 5,870,315 A | 2/1999 | January |
| 5,930,881 A | 8/1999 | Naruse et al. |
| 5,978,077 A | 11/1999 | Koerner et al. |
| 6,078,846 A | 6/2000 | Greer et al. |
| 6,100,923 A | 8/2000 | Sass et al. |
| 6,115,927 A | 9/2000 | Hendrix |
| 6,148,528 A | 11/2000 | Jackson |
| 6,161,419 A | 12/2000 | Langlechner |
| 6,226,879 B1 | 5/2001 | Baird |
| 6,285,959 B1 | 9/2001 | Greer |
| 6,363,619 B1 | 4/2002 | Schirmer et al. |
| 6,397,164 B1 | 5/2002 | Nobis et al. |
| 6,400,451 B1 | 6/2002 | Fukuda et al. |
| 6,404,486 B1 | 6/2002 | Nobis et al. |
| 6,412,183 B1 | 7/2002 | Uno |
| 6,424,411 B1 | 7/2002 | Rapidel et al. |
| 6,456,372 B1 | 9/2002 | Hudy |
| 6,473,978 B1 | 11/2002 | Maas |
| 6,483,577 B2 | 11/2002 | Stieff |
| 6,522,400 B1 | 2/2003 | Horn |
| 6,532,673 B2 | 3/2003 | Jahn et al. |
| 6,542,840 B2 | 4/2003 | Okamoto et al. |
| 6,545,750 B2 | 4/2003 | Roth et al. |
| 6,559,936 B1 | 5/2003 | Colombo et al. |
| 6,640,612 B2 | 11/2003 | Corghi |
| 6,657,711 B1 | 12/2003 | Kitagawa et al. |
| 6,658,749 B2 | 12/2003 | Jackson et al. |
| 6,658,751 B2 | 12/2003 | Jackson et al. |
| 6,690,456 B2 | 2/2004 | Bux et al. |
| 6,691,062 B1 | 2/2004 | Nobis |
| 6,707,557 B2 | 3/2004 | Young, Jr. et al. |
| 6,710,866 B1 | 3/2004 | Adolph |
| 6,714,291 B2 | 3/2004 | Castagnoli et al. |
| 6,731,382 B2 | 5/2004 | Jackson et al. |
| 6,744,497 B2 | 6/2004 | Burns, Jr. |
| 6,748,796 B1 | 6/2004 | Van Den Bossche |
| 6,765,664 B2 | 7/2004 | Groothuis et al. |
| 6,766,229 B2 | 7/2004 | Dry et al. |
| 6,796,035 B2 | 9/2004 | Jahn et al. |
| 6,796,043 B2 | 9/2004 | Jackson et al. |
| 6,802,130 B2 | 10/2004 | Podbielski et al. |
| 6,813,015 B2 | 11/2004 | Knoedler et al. |
| 6,823,598 B1 | 11/2004 | Loescher |
| 6,823,601 B2 | 11/2004 | Murray |
| 6,829,046 B1 | 12/2004 | Groothuis et al. |
| 6,836,970 B2 | 1/2005 | Hirano |
| 6,839,972 B2 | 1/2005 | Jackson et al. |
| 6,842,238 B2 | 1/2005 | Corghi |
| 6,879,403 B2 | 4/2005 | Freifeld |
| 6,912,477 B2 | 6/2005 | Murray |
| 6,915,228 B2 | 7/2005 | Uffenkamp et al. |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,062,861 B2 | 6/2006 | O'Mahony et al. |
| 7,065,462 B2 | 6/2006 | Merrill et al. |
| 7,075,635 B2 | 7/2006 | Groothuis et al. |
| 7,121,011 B2 | 10/2006 | Murray et al. |
| 7,230,694 B2 | 6/2007 | Forster et al. |
| 7,265,821 B1 | 9/2007 | Lawrence et al. |
| 7,331,211 B2 | 2/2008 | Harrill |
| 7,337,650 B1 | 3/2008 | Preston et al. |
| 7,352,455 B2 | 4/2008 | Groothuis et al. |
| 7,380,344 B2 | 6/2008 | Dietrich |
| 7,382,913 B2 | 6/2008 | Dorranc et al. |
| 7,424,387 B1 | 9/2008 | Gill et al. |
| 7,501,980 B2 | 3/2009 | Focke et al. |
| 7,535,558 B2 | 5/2009 | Uffenkamp et al. |
| 7,570,352 B2 | 8/2009 | Flannigan et al. |
| 7,778,748 B2 | 8/2010 | Probst et al. |
| 7,779,544 B2 | 8/2010 | Tentrup et al. |
| 7,860,295 B2 | 12/2010 | Donner et al. |
| 7,864,309 B2 | 1/2011 | De Sloovere et al. |
| 7,907,265 B2 | 3/2011 | Tentrup et al. |
| 7,908,751 B2 | 3/2011 | Nobis et al. |
| 7,974,806 B1 | 7/2011 | Burns et al. |
| 8,096,057 B2 | 1/2012 | Schommer et al. |
| 8,108,062 B2 | 1/2012 | De Sloovere et al. |
| 8,127,599 B2 | 3/2012 | Schommer et al. |
| 8,131,017 B2 | 3/2012 | Bux et al. |
| 8,135,514 B2 | 3/2012 | Kelly et al. |
| 8,150,144 B2 | 4/2012 | Nobis et al. |
| 8,196,461 B2 | 6/2012 | Abraham et al. |
| 8,244,024 B2 | 8/2012 | Dorrance et al. |
| 8,254,666 B2 | 8/2012 | Uffenkamp et al. |
| 8,274,648 B2 | 9/2012 | Corghi |
| 8,363,979 B2 | 1/2013 | Abraham et al. |
| 8,400,624 B2 | 3/2013 | De Sloovere et al. |
| 8,418,543 B2 | 4/2013 | Tentrup et al. |
| 8,448,342 B2 | 5/2013 | Nobis et al. |
| 8,452,552 B2 | 5/2013 | Nobis et al. |
| 8,457,925 B1 | 6/2013 | Stieff et al. |
| 8,489,353 B2 | 7/2013 | Raphael |
| 8,492,701 B2 | 7/2013 | Nobis et al. |
| 8,522,609 B2 | 9/2013 | Nobis et al. |
| 8,538,724 B2 | 9/2013 | Corghi |
| 8,578,765 B2 | 11/2013 | Nobis et al. |
| 8,638,452 B2 | 1/2014 | Muhle et al. |
| 8,650,766 B2 | 2/2014 | Nobis et al. |
| 8,767,382 B2 | 7/2014 | Mori |
| 8,836,764 B2 | 9/2014 | Gruetzmann et al. |
| 8,854,454 B2 | 10/2014 | Abraham et al. |
| 8,918,302 B2 | 12/2014 | Hukkeri et al. |
| 9,001,189 B2 | 4/2015 | Nobis et al. |
| 9,127,937 B2 | 9/2015 | Nobis et al. |
| 9,134,120 B2 | 9/2015 | Schommer et al. |
| 9,170,101 B2 | 10/2015 | Stieff |
| 9,182,477 B2 | 11/2015 | Jones et al. |
| 9,212,907 B2 | 12/2015 | D'Agostino et al. |
| 9,279,670 B2 | 3/2016 | Schommer et al. |

(56) References Cited

U.S. PATENT DOCUMENTS

| | | |
|---|---|---|
| 9,279,882 B2 | 3/2016 | Hukkeri et al. |
| 9,377,379 B2 | 6/2016 | Lee |
| 9,448,138 B2 | 9/2016 | Stieff et al. |
| 9,539,866 B2 | 1/2017 | Mouchet |
| 9,545,966 B2 | 1/2017 | Kim |
| 9,581,524 B2 | 2/2017 | Liu |
| 9,645,051 B2 | 5/2017 | Jin |
| 9,658,062 B2 | 5/2017 | Duff et al. |
| 9,677,974 B2 | 6/2017 | Lee |
| 9,779,560 B1 | 10/2017 | Dorrance et al. |
| 9,779,561 B1 | 10/2017 | Dorrance et al. |
| 9,791,268 B2 | 10/2017 | Buzzi et al. |
| 10,001,429 B2 | 6/2018 | Krueger et al. |
| 10,068,389 B1 | 9/2018 | Strege et al. |
| 10,139,213 B2 | 11/2018 | Herrmann et al. |
| 10,222,455 B1 | 3/2019 | Stieff et al. |
| 10,240,916 B1 | 3/2019 | Golab et al. |
| 10,241,195 B1 | 3/2019 | Stieff et al. |
| 10,284,777 B2 | 5/2019 | Rogers et al. |
| 10,298,814 B2 | 5/2019 | Harrell et al. |
| 10,347,006 B2 | 7/2019 | Kunert et al. |
| 10,365,095 B2 | 7/2019 | D'Agostino et al. |
| 10,436,885 B2 | 10/2019 | Wheeler |
| 10,444,010 B2 | 10/2019 | Strege et al. |
| 10,475,201 B1 | 11/2019 | Hall et al. |
| 10,514,323 B2 | 12/2019 | Corghi |
| 10,567,650 B2 | 2/2020 | Rogers et al. |
| 10,634,488 B2 † | 4/2020 | Stieff |
| 10,670,392 B2 | 6/2020 | Rogers et al. |
| 10,684,125 B2 | 6/2020 | D'Agostino et al. |
| 10,692,241 B2 | 6/2020 | Kunert et al. |
| 10,692,308 B2 | 6/2020 | Cho et al. |
| 10,697,766 B1 | 6/2020 | Dorrance et al. |
| 10,788,400 B2 | 9/2020 | Stieff et al. |
| 10,848,316 B1 | 11/2020 | Stieff et al. |
| 10,871,368 B2 | 12/2020 | Krueger |
| 11,061,120 B2 | 7/2021 | Castorena Martinez et al. |
| 11,243,074 B2 | 2/2022 | DeBoer et al. |
| 11,390,289 B2 * | 7/2022 | Corghi ............... G01S 7/40 |
| 2002/0020071 A1 | 2/2002 | Jackson et al. |
| 2002/0099483 A1 | 7/2002 | Jackson et al. |
| 2004/0049930 A1 | 3/2004 | Murray |
| 2005/0022587 A1 | 2/2005 | Tentrup et al. |
| 2005/0096807 A1 | 5/2005 | Murray et al. |
| 2006/0090356 A1 | 5/2006 | Stieff |
| 2006/0274303 A1 | 12/2006 | Jackson et al. |
| 2006/0279728 A1 | 12/2006 | Dorrance et al. |
| 2008/0007722 A1 | 1/2008 | Golab et al. |
| 2008/0148581 A1 | 6/2008 | Boni et al. |
| 2008/0186514 A1 | 8/2008 | Uffenkamp et al. |
| 2009/0046279 A1 | 2/2009 | Tentrup et al. |
| 2010/0060885 A1 | 3/2010 | Nobis et al. |
| 2010/0238291 A1 | 9/2010 | Pavlov et al. |
| 2010/0321674 A1 | 12/2010 | Corghi |
| 2011/0077900 A1 | 3/2011 | Corghi |
| 2011/0271749 A1 | 11/2011 | Tentrup et al. |
| 2012/0092654 A1 | 4/2012 | De Sloovere et al. |
| 2013/0110314 A1 | 5/2013 | Stieff |
| 2013/0188020 A1 | 7/2013 | Seifert et al. |
| 2013/0325252 A1 | 12/2013 | Schommer et al. |
| 2014/0129076 A1 | 5/2014 | Mouchet et al. |
| 2014/0253908 A1 | 9/2014 | Lee |
| 2014/0253909 A1 | 9/2014 | McClenahan et al. |
| 2014/0278226 A1 | 9/2014 | Stieff et al. |
| 2015/0049188 A1 | 2/2015 | Harrell et al. |
| 2015/0049199 A1 | 2/2015 | Rogers et al. |
| 2015/0134191 A1 | 5/2015 | Kim |
| 2016/0334209 A1 | 11/2016 | Linson |
| 2017/0003141 A1 | 1/2017 | Voeller et al. |
| 2017/0097229 A1 | 4/2017 | Rogers et al. |
| 2018/0052223 A1 | 2/2018 | Stieff et al. |
| 2018/0060036 A1 | 3/2018 | Frisch et al. |
| 2018/0075675 A1 | 3/2018 | Kim |
| 2018/0094922 A1 | 4/2018 | Oki et al. |
| 2018/0100783 A1 | 4/2018 | Stieff et al. |
| 2018/0134529 A1 | 5/2018 | Zecher et al. |
| 2018/0188022 A1 | 7/2018 | Leikert |
| 2018/0259424 A1 | 9/2018 | Tentrup |
| 2018/0276910 A1 | 9/2018 | Pitt et al. |
| 2018/0299533 A1 | 10/2018 | Pliefke et al. |
| 2019/0204184 A1 | 7/2019 | Neumann et al. |
| 2019/0222723 A1 | 7/2019 | Harrell et al. |
| 2019/0249985 A1 | 8/2019 | Stieff et al. |
| 2019/0279395 A1 | 9/2019 | Kunert et al. |
| 2019/0331482 A1 * | 10/2019 | Lawrence ............... G07C 5/08 |
| 2020/0074675 A1 * | 3/2020 | Cejka ................. F16M 11/42 |
| 2020/0088515 A1 | 3/2020 | Rogers et al. |
| 2020/0117210 A1 | 4/2020 | Ren et al. |
| 2020/0130188 A1 | 4/2020 | Lawrence et al. |
| 2020/0141724 A1 | 5/2020 | Lawrence et al. |
| 2020/0273206 A1 | 8/2020 | Corghi |
| 2020/0309517 A1 | 10/2020 | D'Agostino et al. |
| 2020/0320739 A1 | 10/2020 | Kunert et al. |
| 2021/0387637 A1 * | 12/2021 | Rogers ................. H04W 4/48 |
| 2022/0018935 A1 | 1/2022 | Jefferies et al. |

FOREIGN PATENT DOCUMENTS

| | | |
|---|---|---|
| CN | 107856649 A | 3/2018 |
| DE | 2948573 | 6/1981 |
| DE | 19857871 C1 | 10/2000 |
| DE | 102009009046 A1 | 10/2009 |
| DE | 102009015207 | 9/2010 |
| EP | 0593066 | 4/1994 |
| EP | 0593067 | 4/1994 |
| EP | 0679865 A1 | 11/1995 |
| EP | 0766064 A2 | 4/1997 |
| EP | 0994329 | 4/2000 |
| EP | 2808082 | 10/2001 |
| EP | 1221584 | 7/2002 |
| EP | 1260832 A1 | 11/2002 |
| EP | 1505363 | 2/2005 |
| EP | 0946857 B1 | 7/2005 |
| EP | 0943890 B1 | 2/2007 |
| EP | 1376051 B1 | 1/2008 |
| EP | 1295087 B1 | 8/2010 |
| EP | 2302318 A1 | 3/2011 |
| EP | 1818748 B1 | 5/2014 |
| EP | 3084348 B1 | 3/2017 |
| EP | 3036516 B1 | 4/2018 |
| EP | 3608687 A1 | 2/2020 |
| EP | 3228976 B1 | 11/2020 |
| JP | 200505389 A | 3/2005 |
| JP | 4530604 B2 | 8/2010 |
| JP | 2019529918 A | 10/2019 |
| KR | 1020070016095 A | 2/2007 |
| KR | 20100017607 A | 2/2010 |
| KR | 100948886 B1 | 3/2010 |
| KR | 101510336 B1 | 4/2015 |
| KR | 1020150105766 A | 9/2015 |
| KR | 20160137313 A | 11/2016 |
| KR | 101729619 B1 | 4/2017 |
| KR | 20190019403 A | 2/2019 |
| WO | 9515479 A1 | 6/1995 |
| WO | 2000071972 | 11/2000 |
| WO | 0231437 A1 | 4/2002 |
| WO | 2008014783 | 2/2008 |
| WO | 2008086773 A1 | 7/2008 |
| WO | 2008130385 A1 | 10/2008 |
| WO | 2010138543 | 12/2010 |
| WO | 2013079395 A1 | 6/2013 |
| WO | 2015092594 A2 | 6/2015 |
| WO | 2017016541 A1 | 2/2017 |
| WO | 2018035040 A1 | 2/2018 |
| WO | 2018067354 A1 | 4/2018 |
| WO | 2018153723 A1 | 8/2018 |
| WO | 2018158073 A1 | 9/2018 |
| WO | 2018167809 A1 | 9/2018 |
| WO | 2018188931 A1 | 10/2018 |

(56) References Cited

FOREIGN PATENT DOCUMENTS

| WO | 2020056303 A1 | 3/2020 |
|----|---------------|--------|
| WO | 2021005578 A1 | 1/2021 |

OTHER PUBLICATIONS

Screenshots from https://www.youtube.com/watch?v=7wdgc-RsewQ, uploaded on Jul. 31, 2015 by Dürr.
ISRA Vision Systems Press Release, No. 97, May 16, 2006 "Mounting Wheels Automatically On Moving Car Bodies".
Durr Factory Assembly Systems (FAS) materials, Dr. Thomas Tentrup, believed to be dated Sep. 2006, with partial translation of pp. 12-14.
MAHLE Aftermarket Italy S.P.A., TechPRO Digital ADAS, 4 p. Apr. 2019, Parma, Italy.†

\* cited by examiner
† cited by third party

TARGET ALIGNMENT SYSTEM AND METHOD FOR SENSOR CALIBRATION

CROSS REFERENCE TO RELATED APPLICATION

The present application claims priority of U.S. provisional application Ser. No. 63/142,736 filed Jan. 28, 2021, which is hereby incorporated herein by reference in its entirety.

BACKGROUND AND FIELD OF THE INVENTION

The present invention is directed to a system and method for aligning a target and a vehicle relative to each other for calibration of a sensor on the vehicle, and in particular to a sensor mounted on or near a windshield of the vehicle.

The use of sensors are important in a number of automotive safety systems, such as an Advanced Driver Assistance System (ADAS) for a vehicle. A conventional ADAS system will utilize one or more sensors, including for example forward facing cameras mounted behind the windshield of a vehicle, such as on or near the windshield. While these sensors are aligned and/or calibrated by the manufacturer during production of the vehicle whereby they are able to provide accurate driver assistance functionality, the sensors may need realignment or recalibration periodically, such as due to a mishap, such as a collision. In the case of a broken or cracked windshield, a sensor mounted on or near the windshield likewise may be required to be realigned or recalibrated when affixed to a new windshield.

SUMMARY OF THE INVENTION

The present invention provides a system and method for aligning a target to a vehicle for calibration of a sensor of the vehicle, and in particular for aligning a target to a sensor mounted on or near the windshield of the vehicle.

According to an aspect of the present invention, a system for aligning a target to an equipped vehicle for calibration of a sensor on the equipped vehicle includes a target adjustment stand having a base and a target mount moveably mounted on the target adjustment stand with the target mount configured to support a target, and the target adjustment stand further including actuators configured to selectively move the target mount relative to the base. The system further includes a pair of distance targets and a pair of distance sensors configured for use in measuring the distances between respective ones of aligned distance targets and sensors. The distance sensors and distance targets are arranged for measuring distances from the target adjustment stand to either side of a vehicle, with the measured distances used to adjust the position of the target mount. In a particular arrangement, the measured distances are from the target stand to either side of a pair of opposed wheel assemblies of the vehicle.

In accordance with a particular embodiment, the distance targets comprise a pair of wheel targets configured for positioning at opposed wheel assemblies of a vehicle, and the distance sensors are mounted to the target adjustment stand so as to be spaced apart from each other. A specific arrangement of the target adjustment stand includes an upright tower to which the target mount is movably affixed, with the actuators including a yaw actuator for selectively rotating the tower relative to the base and a vertical actuator for vertically moving the target mount. In a particular arrangement, the target mount is vertically and laterally moveable on the tower, and the tower is rotatably attached to the base so as to be rotatable about a vertical axis The system may further include a computer having a display, such as a tablet computer, that is configured to display measured distances from the target adjustment stand to either side of the vehicle between respective ones of aligned distance targets and sensors. The yaw and/or vertical actuators are configured to be adjusted by an operator via one or more switches to adjust the position of the target mount based on the measured distances displayed on the computer. The target adjustment stand may also include a height sensor for measuring the vertical position of the target mount, with the computer configured to display the vertical position distance measured with the height sensor. The sensors may wirelessly transmit measured distance information to the computer.

In a further aspect, the target mount includes a light projector configured to project an indicating line, with the target mount being horizontally moveable and the indicating light being used to laterally position the target mount relative to the vehicle. The base of the target adjustment stand may include wheels for movement on a supporting surface, and may include a lock for fixing the position of the base relative to the surface.

According to a further aspect of the present invention, a method of aligning a target retained on a target adjustment stand to an equipped vehicle for calibration of a sensor on the equipped vehicle includes moving the target adjustment stand relative to the vehicle while measuring distances between the target adjustment stand and distance targets, rotating the target mount relative to the base while measuring distances between the target adjustment stand and the distance targets, centering the target mount to the vehicle by laterally moving the target mount as needed, such as by projecting a light from the target mount to center on the vehicle, placing a calibration target on the target mount, and moving the target mount vertically if needed.

A calibration routine, such as one specified and supplied by an OEM supplier of the vehicle, may then be run to calibrate the vehicle sensor to the vehicle. In the illustrated embodiments the sensor of the vehicle comprises a sensor mounted to, at or near the interior surface of a windshield of the vehicle.

The present invention for target alignment relative to a vehicle for calibration of a sensor on the equipped vehicle provides an efficient and effective system and method to align the target and sensor for calibration of the sensor, such as by way of an original equipment manufacturer ("OEM") specified and provided calibration process. In the case of a sensor mounted on or near the windshield, such as a forward facing camera, the system and method are particularly useful for instances in which windshield replacement or repair are required, including due to cracked or broken windshields. The system and method may be used at a repair facility, including a body shop or windshield replacement facility. Upon aligning the target and sensor, such as in accordance with OEM requirements for the alignment, the calibration process may then be run whereby the proper operation of the sensor with respect to the vehicle may be provided.

These and other objects, advantages, purposes and features of this invention will become apparent upon review of the following specification in conjunction with the drawings.

DESCRIPTION OF THE PREFERRED EMBODIMENTS

Figure 1:
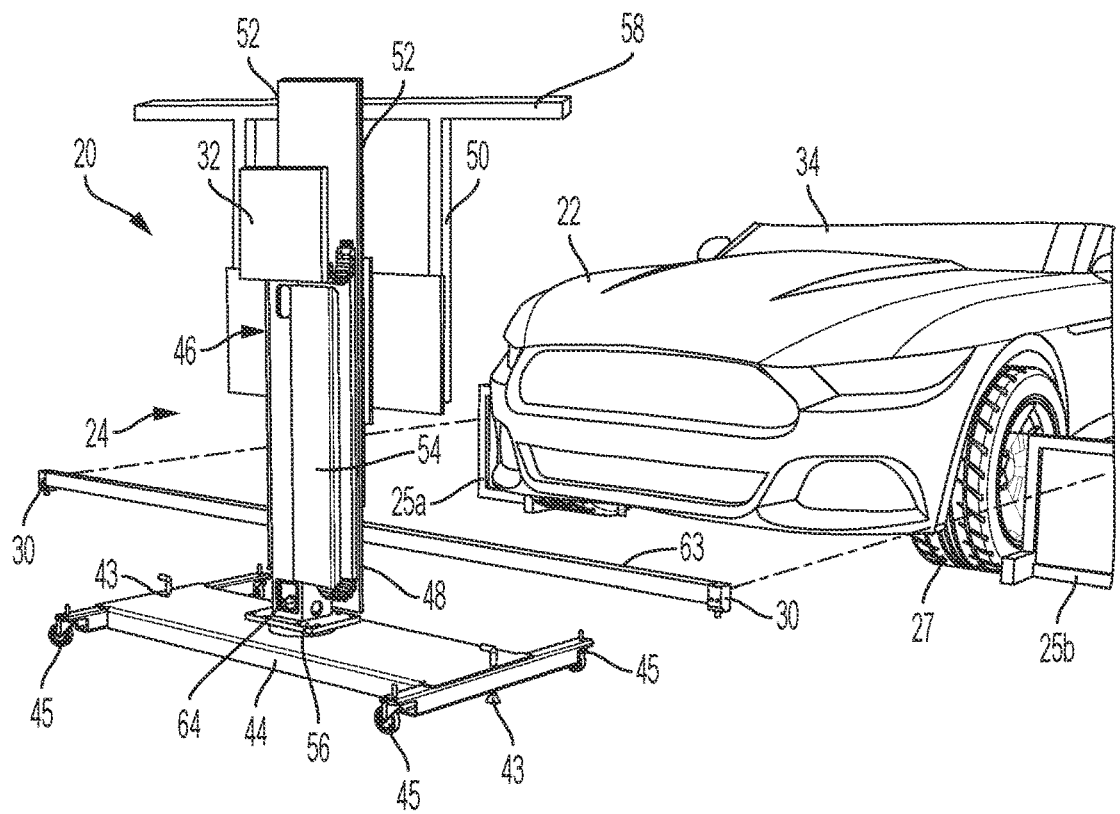
FIG. 1 is a perspective view of a vehicle target alignment system in accordance with the present invention arranged relative to a vehicle.

The present invention will now be described with reference to the accompanying figures, wherein the numbered elements in the following written description correspond to like-numbered elements in the figures. With reference to FIG. 1, a vehicle target alignment system 20 in accordance with an embodiment of the present invention is shown for use in calibrating one or more sensors mounted to a vehicle 22. System 20 includes a target adjustment stand or frame 24 that is configured to adjustably hold and position a calibration target 26 (FIG. 8) relative to vehicle 22 when vehicle 22 and stand 24 are positioned relative to each other. In particular, distance targets or wheel targets 25a, 25b are positioned adjacent the front wheel assemblies 27 of vehicle 22 and an operator, as discussed in more detail below, aligns and positions the target 26 relative to a sensor 28 (FIG. 3) mounted to vehicle 22 using distance sensors 30 and controller 32 on stand 24 whereby the sensor 28 may be appropriately calibrated to the vehicle 22, such as by running an original equipment manufacturer ("OEM") calibration routine for the specific vehicle 22 and sensor 28. System 20 may thus be used in the calibration of a vehicle mounted advanced driver assistance system ("ADAS") sensor, such as a forward facing camera sensor 28 of the vehicle 22 mounted on or near the vehicle windshield 34. In particular, system 20 may be advantageously utilized in a repair facility when a windshield 34 must be replaced, such as after being damaged in a collision, broken by road debris, or the like. System 20 may also be used to verify and document that the proper calibration process is performed.

Figure 2:
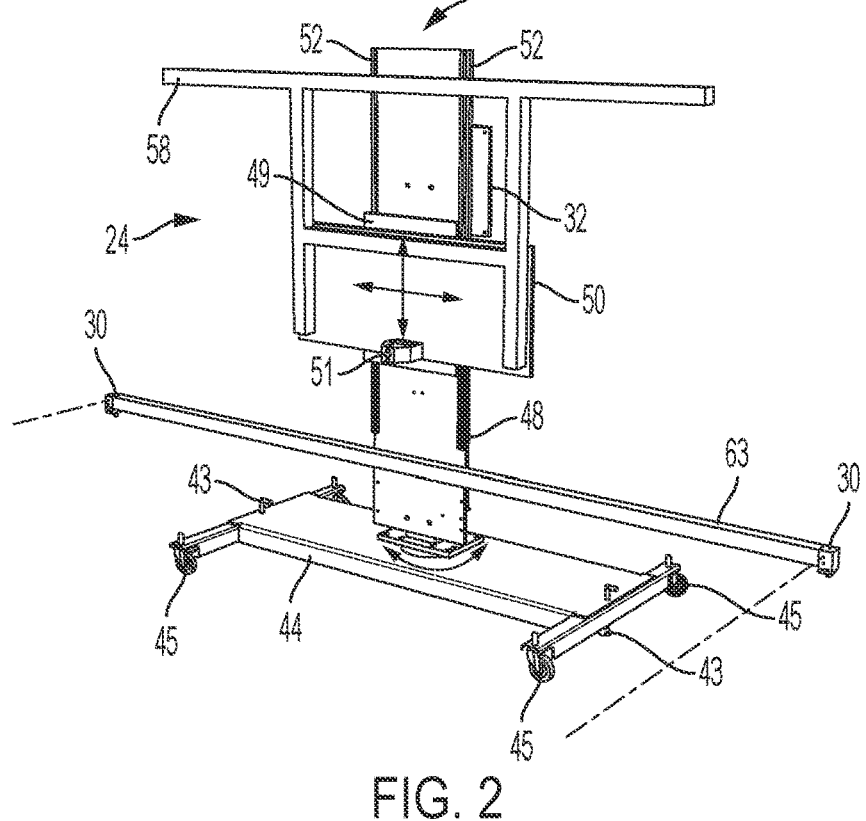
FIG. 2 is a front perspective view of the target adjustment stand or frame of FIG. 1.

In the illustrated embodiment target adjustment, stand 24, with reference to FIGS. 1 and 2, includes a base frame 44 that is movably supported by wheels 45 for longitudinal and lateral movement of stand 24 relative to vehicle 22. Base frame 44 in turn includes locks for use in fixing stand 24 in a desired position on the floor surface, which are shown in the embodiment as a pair of floor anchors 43, but may alternatively be caster locks or the like. A tower assembly 46 is mounted to base frame 44, with tower assembly 46 including a vertically oriented member or tower 48 to which is mounted a target support assembly or frame 50 that is vertically moveable up and down along rails 52 on tower 48. Target support frame 50 is additionally moveable laterally or horizontally side-to-side relative to tower 48, such as by way of one or more horizontally mounted linear bearings 49 that are used to affix target support frame 50 to tower 48, and includes a light projector 51 that, as discussed below, is used to laterally adjust the target support frame 50 relative to vehicle 22. Target support frame 50 further includes a target mount 58 to which various targets 26 may be selectively affixed Stand 24 includes an actuator 54 for vertically moving target support assembly 50 up and down along rails 52. Still further, tower assembly 46 is rotatably mounted to base frame 44 by way of a bearing assembly 56 disposed between the tower 48 and base frame 44 so as to be able to pivot about a vertical or Z-axis, with tower assembly 48 being pivoted by actuator 64. It should be appreciated, however, that in other embodiments alternative arrangements and configurations of actuators for movement of tower assembly 46 in the various axes relative to base frame 44 may be employed, as well as alternative controllers for the various operations discussed herein. The actuator for rotating tower assembly 46 may, for example, be disposed beneath base frame 44. As further understood from FIGS. 1 and 2, stand 24 includes a cross bar or member 63 mounted to tower 48, with cross member 63 supporting the pair of distance sensors 30 at opposed ends of cross member 63. Cross member 63 thus forms a pair of arms extending in opposed directions from tower 48 to which sensors 30 are mounted. In the illustrated distance sensors 30 are configured as time-of-flight ("ToF") sensors, although alternative distance sensors may be employed.

As discussed in more detail below, the actuators 54, 64 are selectively controllable for movement by an operator using controller 32, where system 20 further includes a computer device having a display 65 (FIGS. 10A-12B) in communication with distance sensors 30 for providing information to the operator regarding the position of stand 24 relative to vehicle 22. In the illustrated embodiment, display 65 is part of a portable computer 67, such as a tablet computer or laptop. Alternatively, however, the display 65 may be configured as part of controller 32 or a separate computer device.

Figure 3:
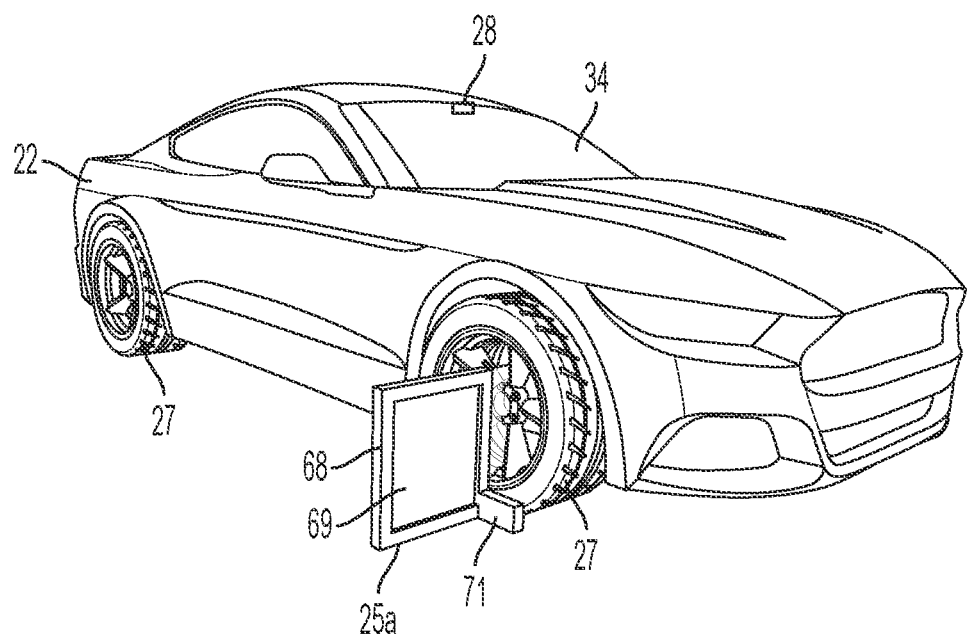
FIGS. 3 and 3A are perspective views of wheel targets positioned adjacent a wheel assembly of the vehicle of FIG. 1.
Figure 3A:
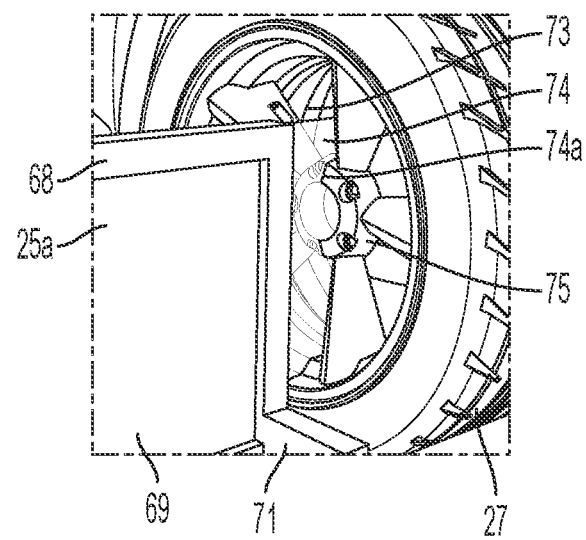
Figure 3B:
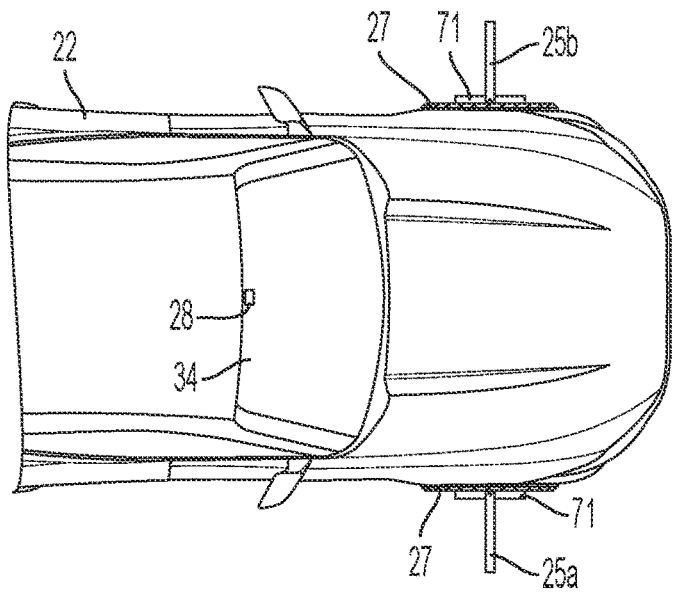
FIG. 3B is a top view of the vehicle of FIG. 1 illustrating wheel targets as shown in FIG. 3 positioned adjacent the wheel assemblies on either side of the vehicle.

System 20 is used by initially driving vehicle 22 into an initial or start position, such as by being pulled into a bay of a repair facility, with the wheel assemblies 27 of vehicle 22 being oriented into a straight position relative to the longitudinal axis of vehicle 22. With reference to FIGS. 3, 3A and 3B, an operator then places a separate wheel target 25a, 25b adjacent each of the front wheel assemblies 27 of vehicle 22. In the illustrated embodiment, each wheel target 25a, 25b includes a frame 68 and a planar panel 69, where frame 68 is constructed to rest on the floor surface upon which vehicle 22 is positioned with panel 69 being perpendicular to the floor surface. Frame 68 further includes a longitudinal frame extension member 71 that is oriented to be perpendicular to panel 69 and is configured to be positioned adjacent the tire and/or wheel of the wheel assembly 27 so as to square wheel targets 25a, 25b relative to the wheel assemblies 27, and thereby square wheel targets 25a, 25b with the longitudinal axis of vehicle 22. In the illustrated embodiment, frames 68 additionally include light projectors 73, such as lasers, for projecting a vertically oriented planar indicating light 74 (see FIG. 3A) to aid in aligning wheel targets 25a, 25b with the center of wheel assemblies 27, where the indicating light 74 is coplanar with the panel 69. As understood from FIG. 3A, wheel targets 25a, 25b are positioned until the indicating light bisects the center hub 75 of wheel assemblies 27 by an indicating line 74a formed by indicating light 74 on hub 75. The operator may, for example, visually center the indicating line 74a formed by indicating light 74 on the center hub 75. In this way, wheel targets 25a, 25b are positioned in known orientations both laterally and longitudinally relative to vehicle 22. It should be appreciated that alternative wheel targets may be employed within the scope of the present invention, including, for example, wheel targets that attach to wheel assemblies 27 rather than engage by contact with wheel assemblies 27 in the illustrated embodiment. Still further, alternative wheel targets may include alternative members for contacting wheel assemblies 27.

Figure 4:
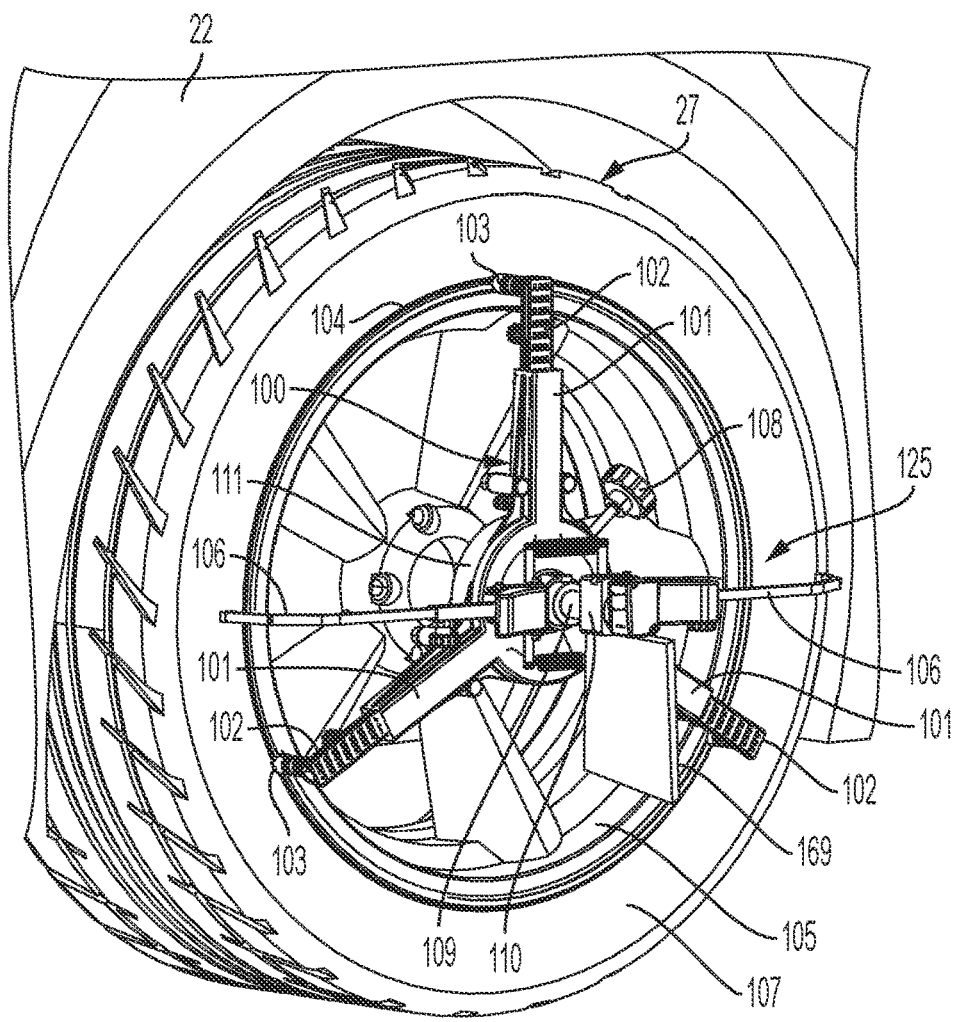
FIG. 4 is a perspective view of an alternative wheel target mounted to a wheel assembly of the vehicle of FIG. 1.

For example, an alternative wheel target 125 is shown in FIG. 4 comprising a wheel clamp 100 supporting a panel 169, where when clamp 100 is secured to the wheel assembly 27 the panel 169 is perpendicular to the wheel assembly 27 and is centrally aligned in a planar manner with the rotational axis of the wheel assembly 27. In the illustrated embodiment wheel clamp 100 includes multiple adjustable arms 101 having extendable and retractable projection arms 102 to which are mounted claws 103, where claws 103 are configured for engaging to the wheel flange 104 of the wheel 105 of the wheel assembly 27. Also provided are optional retention arms 106 that engage with the tire 107 of the wheel assembly 27. In use, claws 103 may be disposed about the wheel flange 104 with a spacing of approximately 120 degrees, with projection arms 102 being drawn in, such as by the rotatable handle 108 shown, to securely fix the clamp 100 to the wheel flange 104 of the wheel 105 of the wheel assembly 27. When so mounted, clamps 100 are co-planar with a plane defined by the wheel 105 and are centered on wheel 105, where wheel 105 is mounted to the hub of the axle, which establishes the axis of rotation such that the clamps 100 are mounted about the axis of rotation of wheel 105. The clamps 100 further include a central hub 111, which when mounted to wheel 105 is centered on the wheel 105 and is aligned about the axis of rotation of wheel 105. Central hub 111 in turn includes a post or shaft 109 and a bearing assembly or mount or block 110 mounted coaxially to shaft 109 so as to be disposed perpendicularly to shaft 109 and is able to rotate on shaft 109. Panel 169 in turn is mounted to bearing block 110. Bearing block 110 pivots on shaft 109 such that due to gravity panel 169 will naturally rotate into a vertical orientation.

Figure 5:
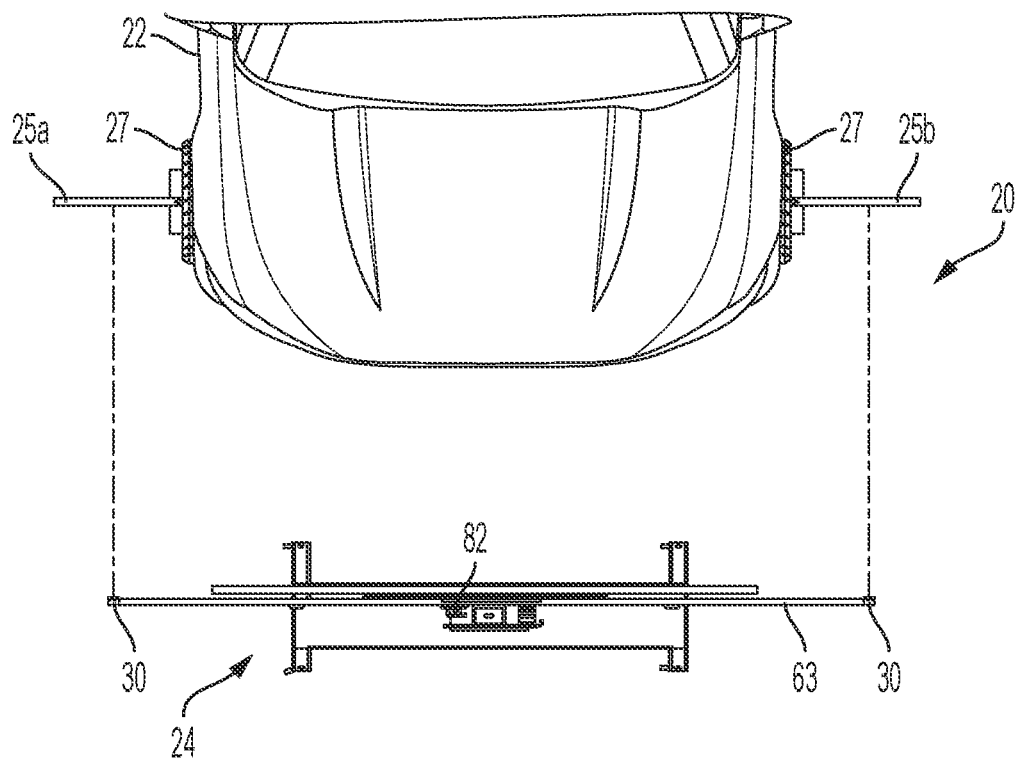
FIG. 5 is a top view of the vehicle target alignment system of FIG. 1.

With reference to FIG. 5, once the wheel targets 25a, 25b (or 125) are in place, an operator may then position stand 24 relative to vehicle 22 to set the longitudinal distance of stand 24 relative to vehicle 22. As understood from FIGS. 1 and 5, cross member 63 spans the width of vehicle 22 so as to position distance sensors 30 in relation to wheel targets 25a, 25b. In the illustrated embodiment, cross member 63 is disposed at a vertical height on tower 48 whereby distance sensors 30 are aligned with panels 69 of wheel targets 25a, 25b. Sensors 30 are thereby configured to measure distances to each of wheel targets 25a, 25b by, for example, projecting a light source signal at panels 69 and receiving the reflected signal back. As discussed in more detail below, operator receives via display 65 information regarding the distance of stand 24 from vehicle 22 as measured by distance sensors 30, as well as information regarding the desired distance to which stand 24 is to be positioned, such as based on the particular make, model and year of vehicle 22. The operator then manually adjusts the stand 24 longitudinally relative to vehicle 22 via wheels 45 of base frame 44 based on the feedback from the distance measurements obtained with the distance sensors 30. Upon obtaining a desired orientation of stand 24 as specified on the display 65, operator is then able to fix base frame 44 to the floor surface by way of locks 43.

Figure 6:
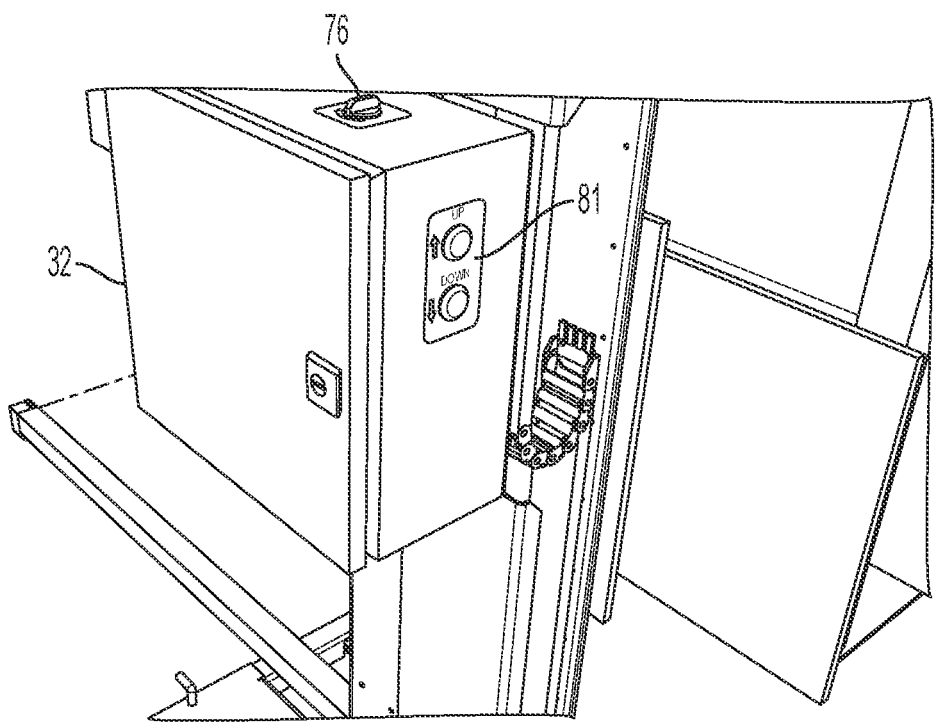
FIG. 6 is a perspective view of the controller of the target adjustment stand of FIG. 1.

The operator may then more precisely or fine adjust the yaw position of tower assembly 46 by way of actuator 64 that rotates tower assembly 46 about the vertical axis. As shown in FIG. 6, controller 32 includes a switch 76 for selectively activating actuator 64 to rotate in either a clockwise or counterclockwise direction. In particular, based on the two distance sensors 30 and the feedback information on the distance measured therewith provided to the operator on display 65, the operator may rotate the tower assembly 46 so that the two distance sensors 30 are equidistant from the respective wheel targets 25a, 25b due to cross bar 63 being mounted to tower assembly 46 for rotation therewith. In this way the tower assembly 46 is squared to the longitudinal axis of vehicle 22 at the desired longitudinal distance.

Figure 7A:
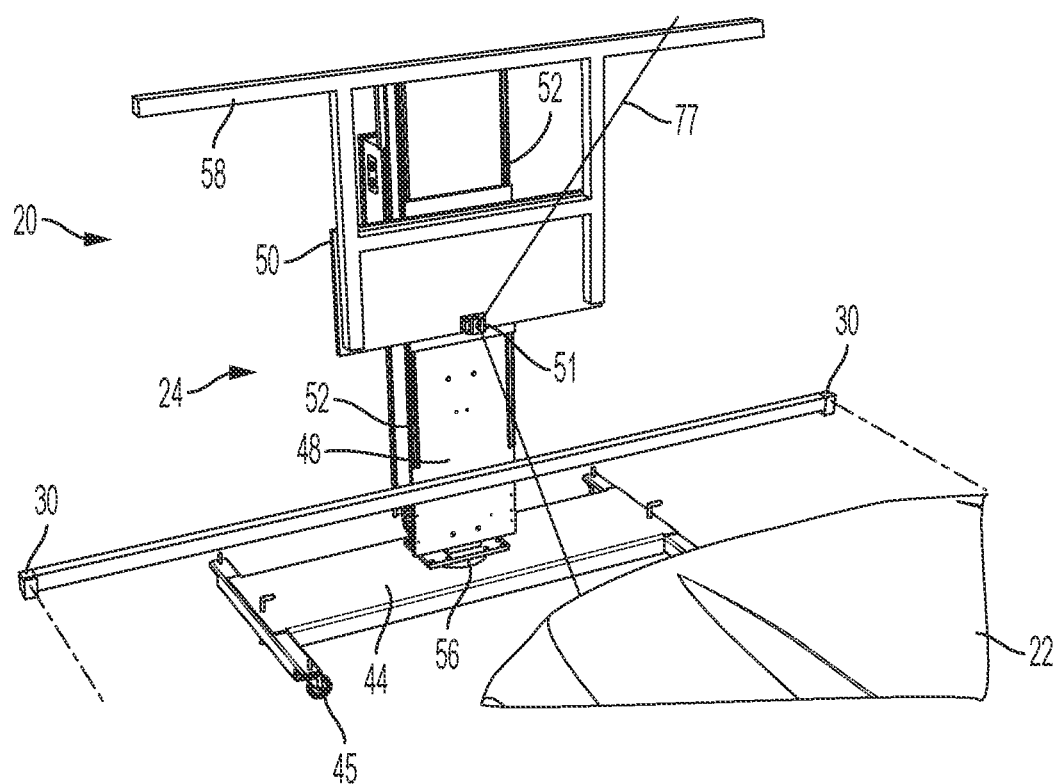
FIGS. 7A and 7B are perspective views illustrating the use of a light projector of target adjustment stand projecting a reference line for use in centering the target mount relative to the vehicle.
Figure 7B:
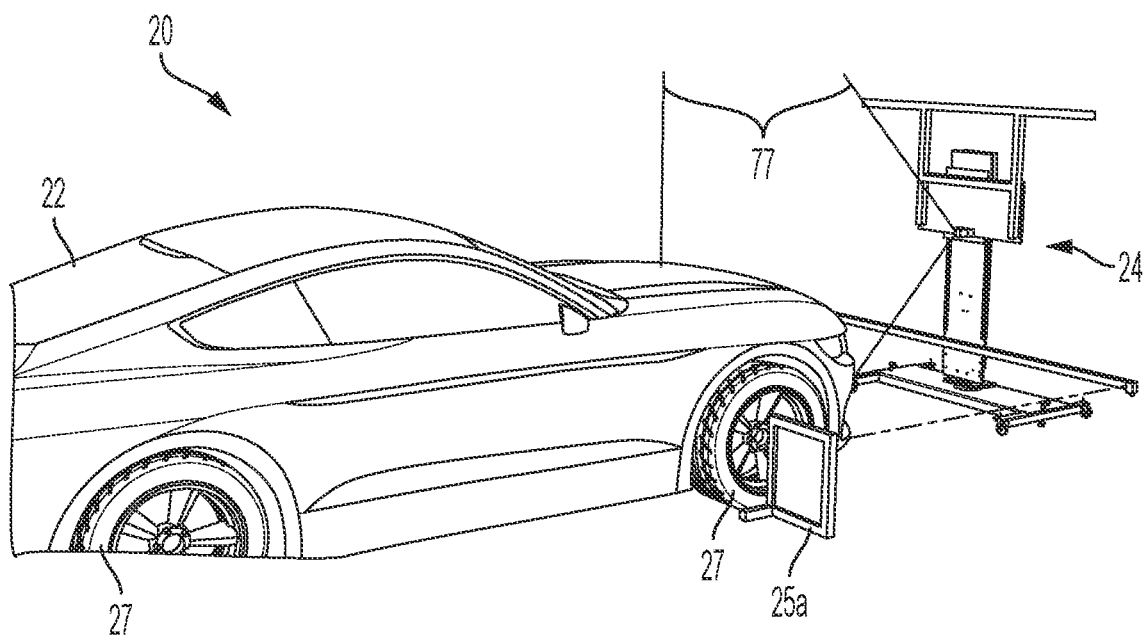
Figure 7C:
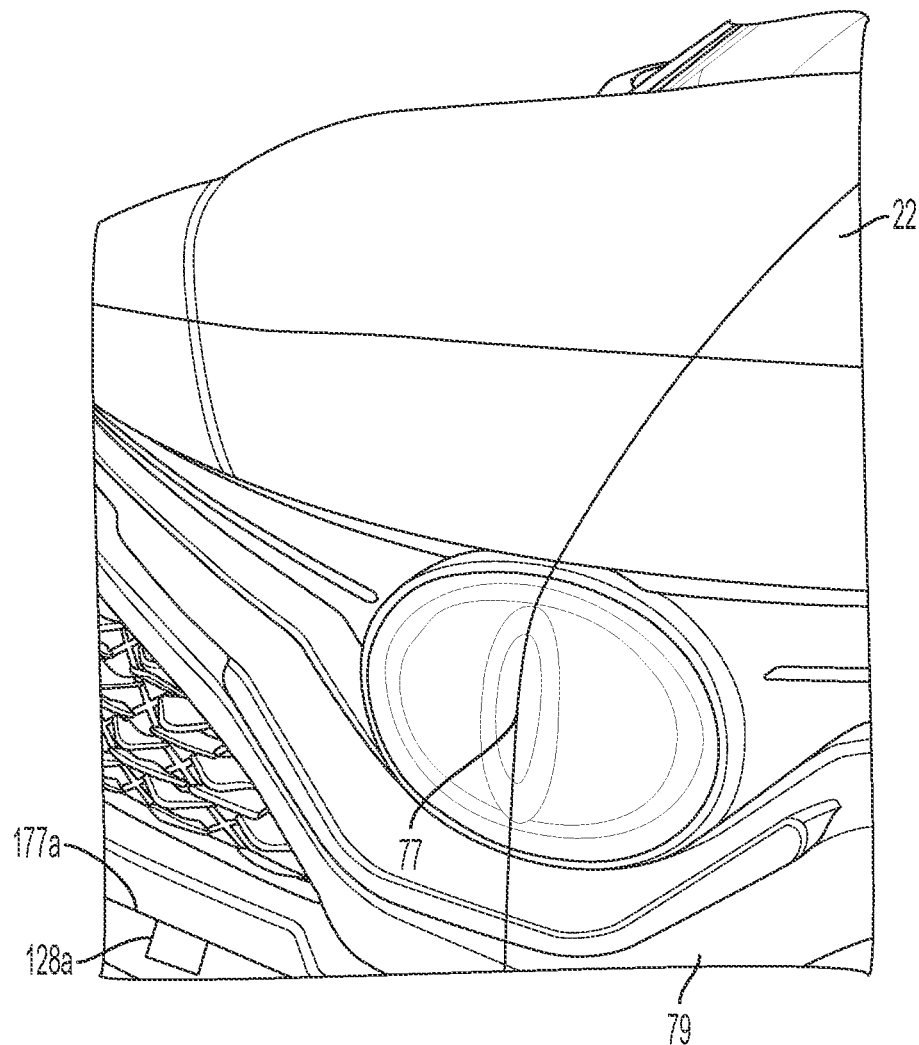
FIG. 7C is a perspective view of the reference line projected from the target adjustment stand onto the front of a vehicle.

Upon establishing the longitudinal position of stand 24, the operator may then set the lateral orientation of the target support frame 50 and accompanying target mount 58 relative to vehicle 22, as understood from FIGS. 7A-7C. Light projector 51 is turned on and is configured to project a vertically oriented light plane 77, where light projector 51 may be configured as a laser or other type of light projector. As noted, target support frame 50 is laterally moveable from side-to-side by way of linear bearing 49. The operator may then laterally move the target support frame 50 such as by manually sliding the frame 50 until the projected light 77 from light projector 51 is centered on vehicle 22, which as understood from FIG. 7C may be established by centering the projected light 77 on a center hood emblem or badge 79 on vehicle 22, such as on the front bumper or fascia of vehicle 22. In the illustrated embodiment the operator may visually center the projected light 77 on the badge 79 while manually sliding target support frame 50 from side-to-side, but may alternatively employ a visual gauge or the like, or may be powered for side-to-side motion by an actuator. Upon obtaining the desired lateral center position, the target support frame 50 may be locked relative to tower 48 such as by way of locks (not shown) on or associated with linear bearing 49 to prevent further movement, where the locks may be configured as setscrews, clamps or the like.

Figure 8:
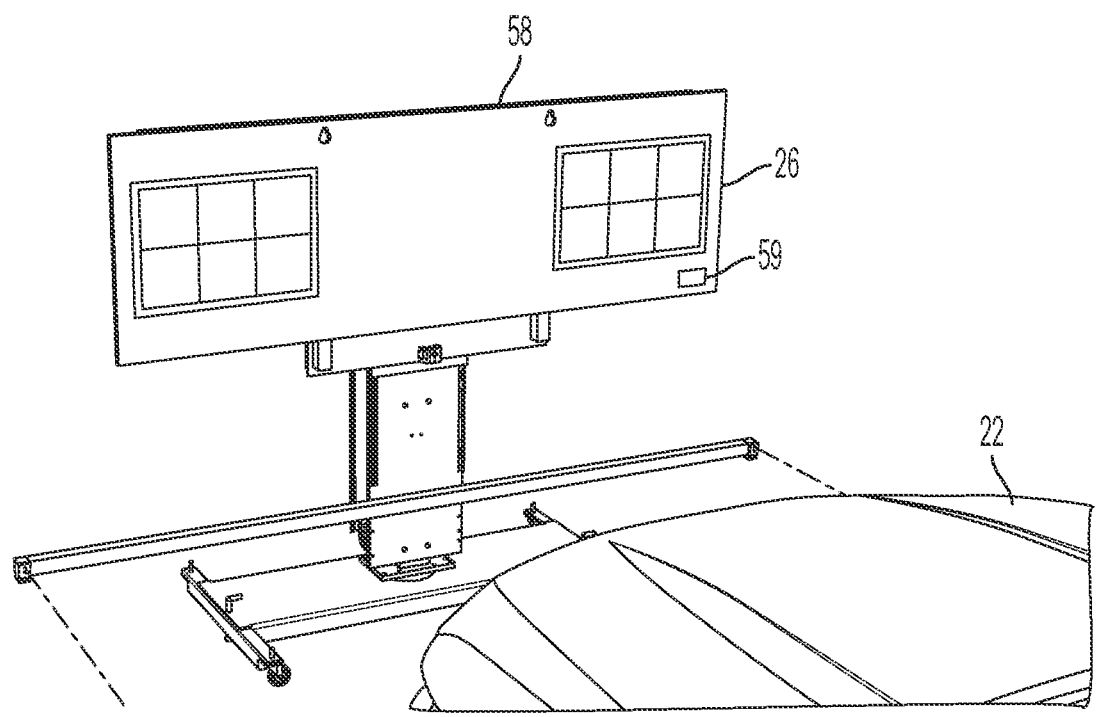
FIG. 8 is a perspective view of the target adjustment system of FIG. 1 including a calibration target mounted to the target adjustment stand.

With reference to FIG. 8, the operator may then mount the required calibration target 26 to the target mount 58 and position the target support frame 50 and associated target mount 58 into the appropriate vertical position. It should be appreciated that multiple calibration targets 26 may be needed for various makes, models and years of vehicles, and associated sensors, and that the particular calibration target 26 to be used in calibrating a given vehicle sensor 28 will depend on the particular sensor 28 and be selectable based on, for example, the make, model and year of vehicle 22, as well as potentially based on particular features, options or packages on vehicle 22. As discussed in more detail below, system 20 is thus configured to provide instructions to the operator via display 65 as to which target 26 to use, as well as includes a verification program or system to ensure that the correct calibration target 26 is used for the given vehicle 22 and sensor 28 at issue. For example, in the illustrated embodiment, calibration targets 26 are provided with RFID tags 59 and display 65 not only prompts the operator as to which calibration target 26 to use, but the system 20 via a computer program, such as within controller 32 or computing device 67, requires the operator to scan the RFID tag of the calibration target 26 to confirm selection of the proper target 26. The operator, for example, may scan the RFID tag with a separate scanner, or with the computing device 67.

Controller 32, as shown in FIG. 6, additionally includes one or more vertical positioning switches 81, which in the illustrated embodiment comprise an up button and a down button for controlling actuator 54. In the embodiment shown, stand 24 is constructed to include a height sensor 82 (FIG. 5) associated with target support frame 50 and thus with the target mount 58. For example, the height sensor 82 may comprise a string potentiometer that is calibrated, or may be constructed as another known distance sensors whereby the vertical adjustment and positioning of target mount 58 is thus monitored. The vertical orientation of target mount 58 is thus known and calibration targets 26 are likewise constructed so as to position the target indicia depicted on calibration targets 26 in a particular orientation that is known or taken into account by system 20. It should be appreciated that alternative techniques may be employed for monitoring the vertical height. For example, based on a controlled motion and known positioning of actuator 54. Accordingly, display 65 may likewise provide vertical position information to the operator to instruct the operator where to vertically position the target mount 58 whereby the operator may then adjust the target mount 58 up and down via switch 81 to the desired vertical position, such as may be specified or required by an OEM calibration process.

Upon positioning the calibration target 26 into the specified position with respect to the longitudinal distance from vehicle 22, the yaw about the vertical axis of tower 48, and the vertical height along tower 48, operator may then initiate a calibration sequence for calibrating the sensor 28 to the vehicle 22 using the positioned calibration target 26. This may involve, for example, an OEM specified and provided calibration process.

An alternative target adjustment stand or frame 124 in accordance with the present invention is illustrated in FIGS. 9A-9E, where stand 124 shares similar features as stand 24 discussed above. Accordingly, the similar features of stand 124 are marked with like reference numbers as used with stand 24, but with "100" added to the reference numbers of stand 124. Due to the similarities, not all of the features and components of stand 124 are discussed herein.

Target adjustment stand 124 is similarly configured to adjustably hold and position a calibration target 26 relative to a vehicle 22, where stand 124 is positioned relative to vehicle 22 using wheel targets 25a, 25b or 125 so as to align and position the target 26 relative to a sensor 28 mounted to the vehicle 22 using distance sensors 130 and controller 132 on stand 124 whereby the sensor 28 may be appropriately calibrated to the vehicle 22.

Figure 9A:
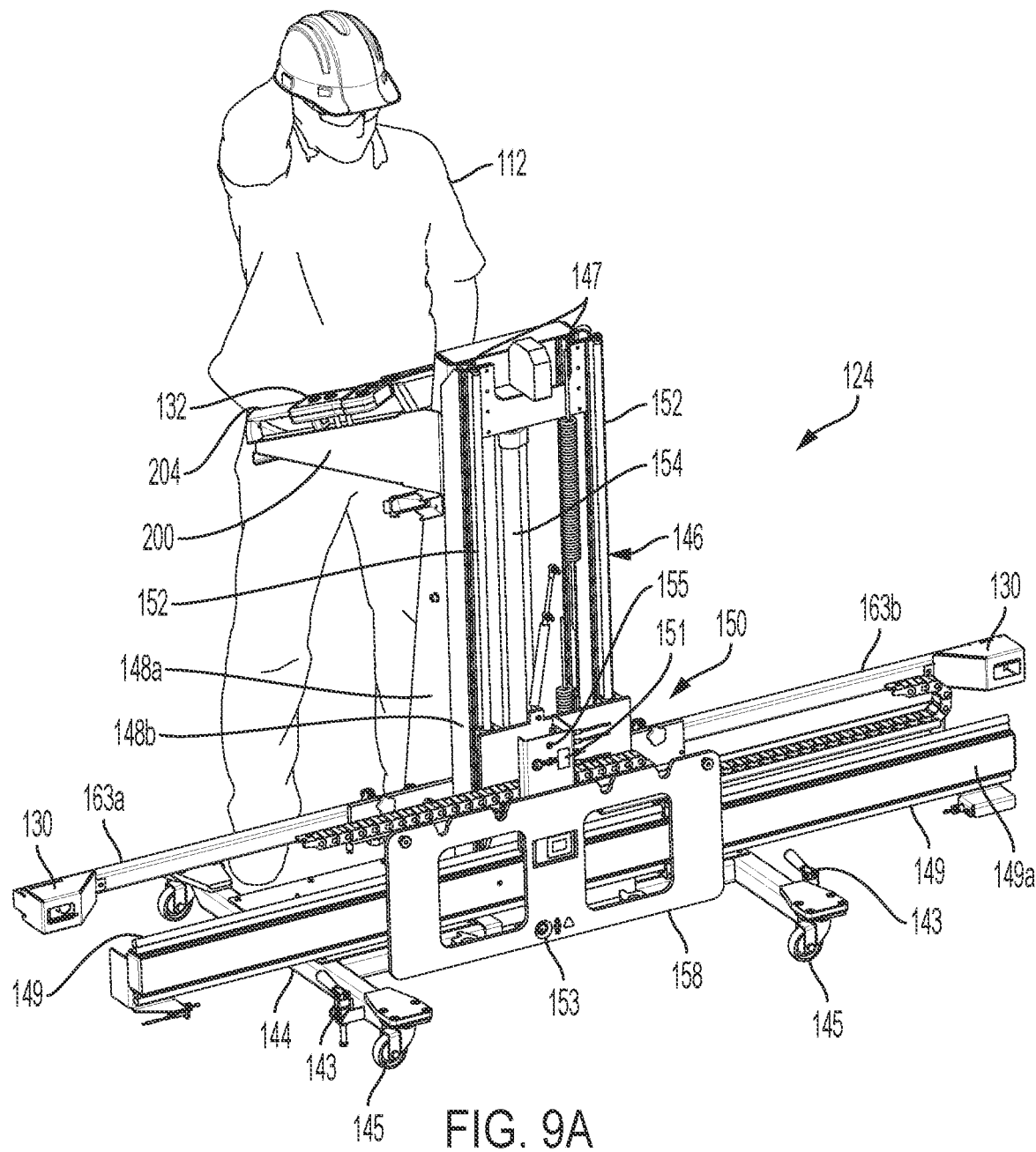
FIG. 9A is a front perspective view of an alternative target adjustment stand in accordance with the present invention shown in a deployed orientation.
Figure 9B:
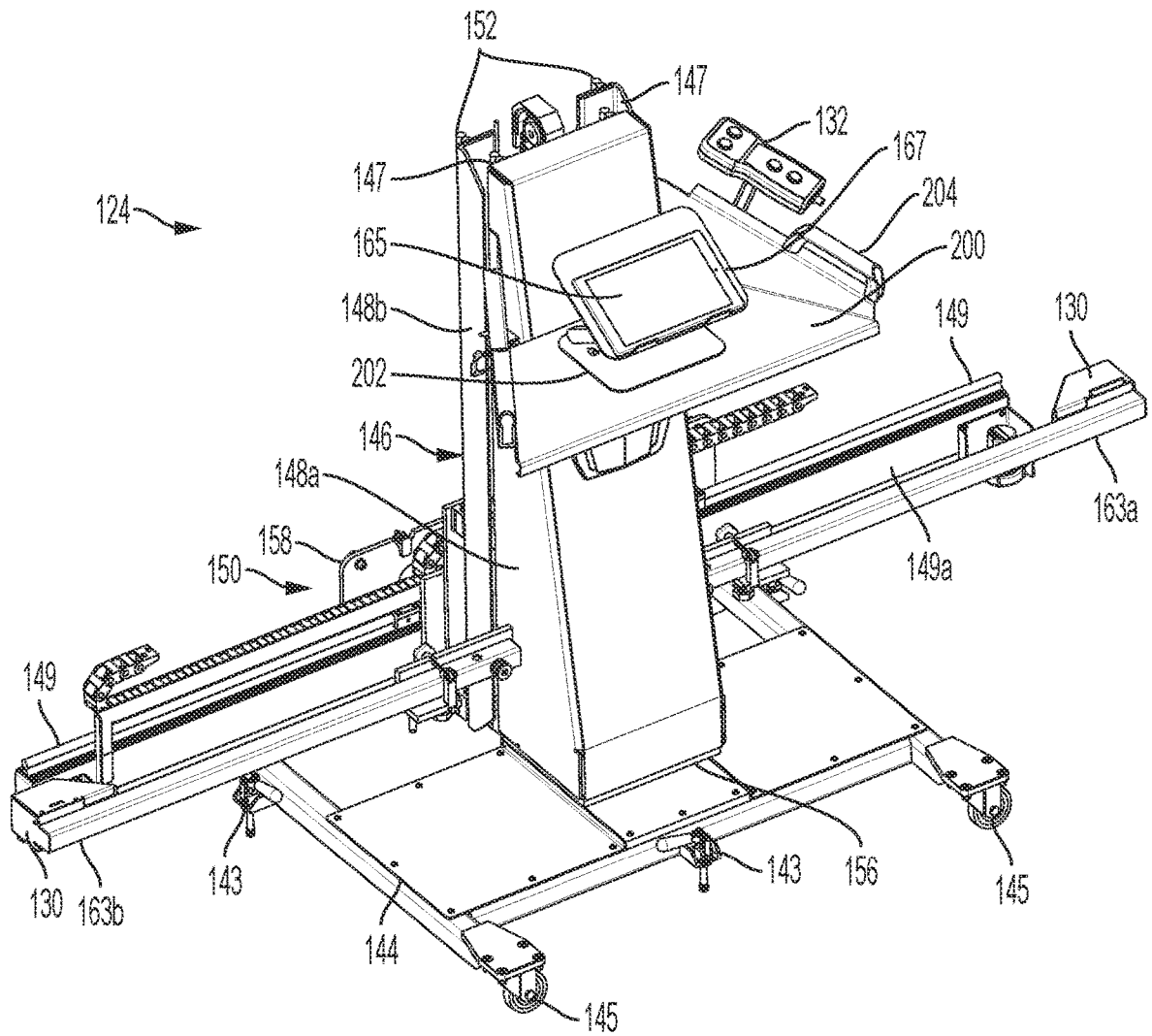
FIG. 9B is a rear perspective view of the target adjustment stand of FIG. 9A.
Figure 9C:
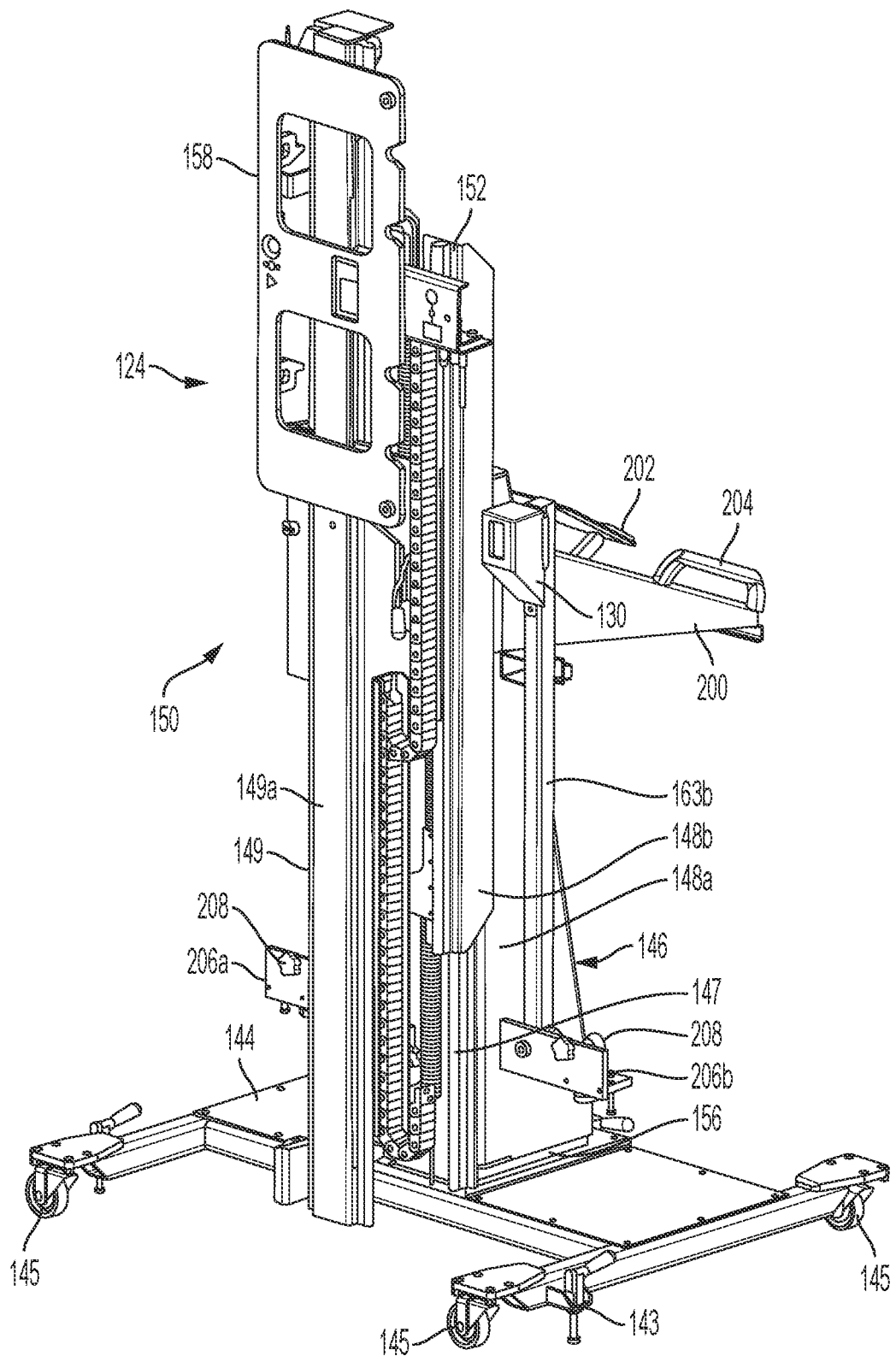
FIG. 9C is a front perspective view of the target adjustment stand of FIG. 9A shown in a storage orientation.
Figure 9D:
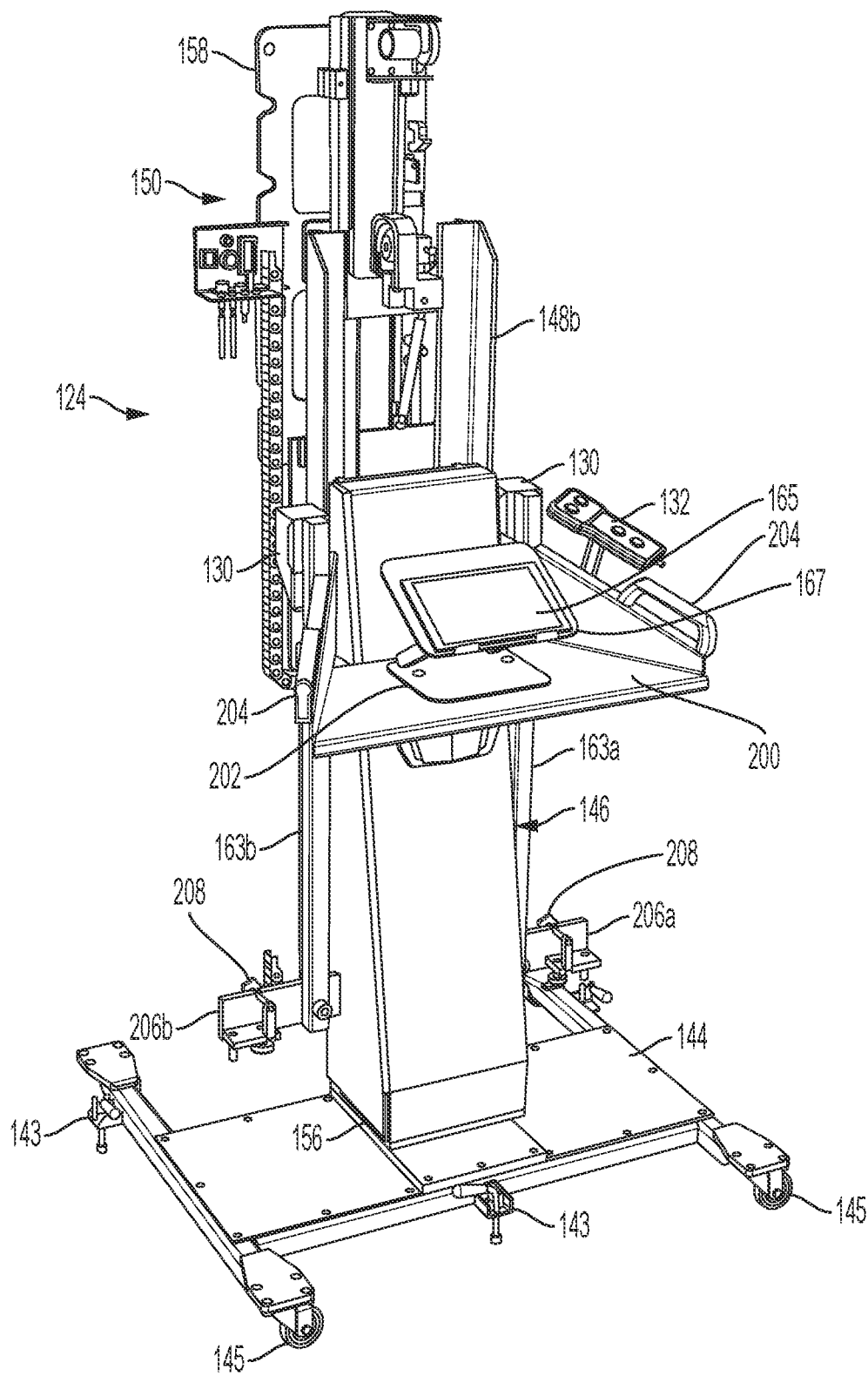
FIG. 9D is a rear perspective view of the target adjustment stand of FIG. 9A shown in the storage orientation.

Stand 124 includes a base frame 144 that is movably supported by wheels 145 and includes locks or anchors 143. A tower assembly 146 is mounted to base frame 144, with tower assembly 146 including a vertically oriented base or first tower member 148a to which is mounted a vertically extendable second tower or extension member 148b, where extension member 148b is slidable on rails 147 (FIG. 9C) of base member 148a. In turn, a target support assembly or frame 150 is mounted to extension member 148b, where assembly 150 is vertically moveable up and down along rails 152 on member 148b. Target support frame 150 includes a target mount 158 that is moveable laterally or horizontally side-to-side relative to tower 146, such as by way of one or more horizontally mounted linear bearings 149 on rail 149a. Still further, a light projector 151 is provided at target mount 158 that is used to laterally adjust the target mount 158 relative to vehicle 22, where projector 151 projects a vertical line in like manner to projector 51 discussed above that may be used to center target mount 158 on vehicle 22. Target mount 158 is provided with an additional light projector 153 that projects a horizontal line, such as a laser light or the like. Light projector 153 may be used to project a horizontal indicating light on vehicle 22 for use in vertically orienting target mount 158 relative to a feature or component on vehicle 22. For example, as understood from FIG. 7C, a horizontal indicating light 177a may be positioned relative to a radar module 128a of vehicle 22 and thereby set the vertical height of target mount 158. Still further, as also shown in FIG. 9A, target mount 158 may additionally include a camera 155 for taking images of the calibration setup and arrangement relative to the vehicle 22, such as for documenting compliance with the calibration procedures, where such images may be saved to and/or stored on computer 167.

Various targets 26 may be selectively affixed to the target mount 158 of target support assembly 150, such as by hooking projections on the targets 26 onto receptacles of the target mount 158, or the like. Stand 124 includes an actuator 154 for vertically moving extension member 148b up and down relative to base member 148a, as well as for vertically moving target support assembly 150 up and down along rails 152. Tower assembly 146 is also rotatably mounted to base frame 144 by way of a bearing assembly 156 disposed between the tower 148 and base frame 144 so as to be able to pivot about the vertical or Z-axis, with tower assembly 148 being pivoted by another actuator disposed beneath base frame 144. Stand 124 also includes a pair of cross bars or members or arms 163a, 163b mounted to tower 148, with each arm 163a, 163b supporting a distance sensor 130 at an opposed end of the respective arm 163a, 163b.

The actuators of stand 124 for rotating tower assembly 146 and for vertically adjusting the height of target support frame 150 are selectively controllable for movement by an operator 112 using controller 132, where the system further includes a tablet computer device 167 having a display 165 and being in communication with distance sensors 130 for providing information to the operator 112 regarding the position of stand 124 relative to vehicle 22. As shown in the embodiment of FIGS. 9A-9D, controller 132 comprises a handheld pendant controller for use by the operator 112 with buttons for controlling the actuators of stand 124. In like manner to stand 24, the target mount 158 is manually moveable along bearings 149, but may alternatively employ an actuator for powered movement via controller 132. Controller 132 may be wireless device or may be wired to stand 124.

Stand 124 additionally includes a platform or desktop surface 200 on which computer 167 are mounted via holder 202, and where controller 132 may be mounted or placed when not in use. Platform 200 further includes handles 204 by which operator 112 can grasp when moving stand 124.

Figure 9E:
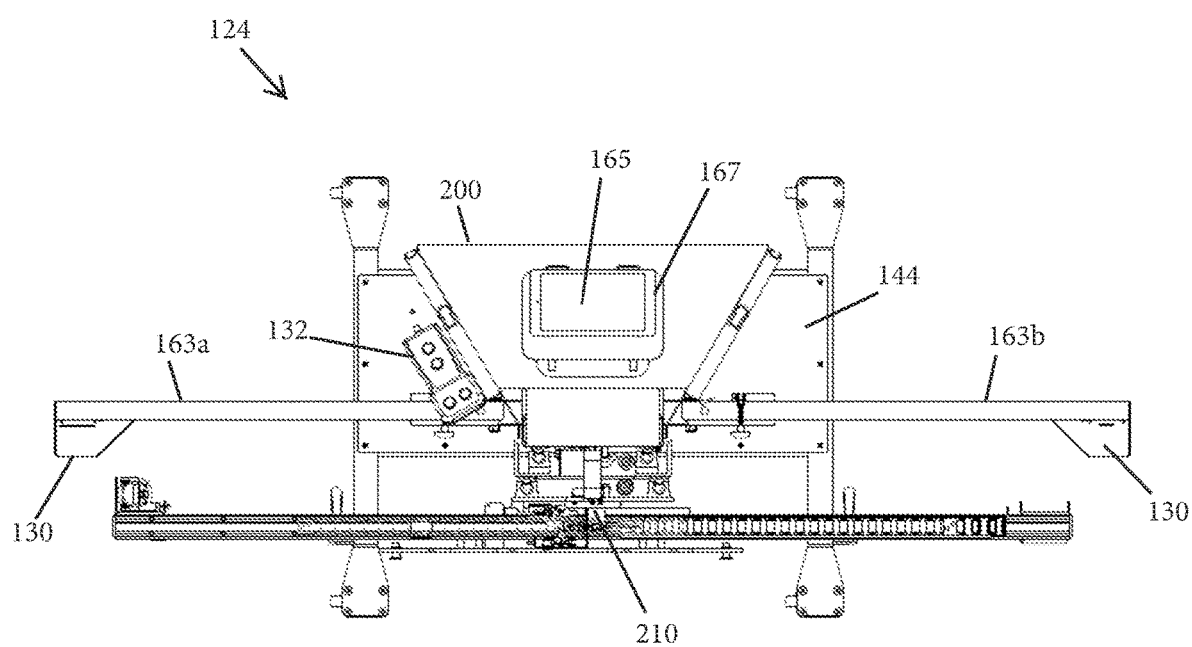
FIG. 9E is a top elevation view of the target adjustment stand of FIG. 9A.

Of particular note is that stand 124 is collapsible into a storage position (FIGS. 9C and 9D) when stand 124 is not in use. To this end, each of the arms 163a, 163b are pivotable between an extended horizontal position and a retracted or folded position in which the arms 163a, 163b are vertically oriented. Each arm 163a, 163b is pivotably mounted to and retained within a respective brace 206a, 206b, where the braces 206a, 206b are attached to the tower 148. Retention screws 208 are used to selectively secure the arms 163a, 163b in the desired retracted or extended positions. Still further, target support assembly 150 is additionally rotatable relative to tower 148 whereby it may be set in a horizontal orientation for use and rotated into a vertical orientation for storage. This includes the rail 149a and target mount 158 being rotably attached to the tower 148, such as by shaft 210 (FIG. 9E).

Referring now to FIGS. 10A-12B, an exemplary computing device 67 such as a tablet computer having a display 65 is illustrated for use in providing instructions and information to the operator for the calibration of sensor 28, including to position the calibration target 26 as discussed above. As noted, the positioning of stand 24, and selection and use of a calibration target 26 will depend on the particulars of the vehicle 22 and sensor 28 at issue. Accordingly, in an initial step information regarding the vehicle 22 is entered into system 20, such as by way of the operator entering the data into computer 67, which may be done by manual entry, scanning, or by reading data from an electronic control unit ("ECU") of vehicle 22, or other such data acquisition operation. Based on the identified vehicle 22 and sensor 28 requiring calibration, system 20 may then provide the operator with particular information and instructions required. It should be appreciated that system 20 then operates based on the known configuration, orientations and dimensions of the vehicle 22 entered by the operator and the known configuration, orientations and dimensions of stand 24. This includes, for example, the known distances from the center of the hubs 75 to the sensor 28 as installed on the windshield 34 of vehicle 22, the known height of the sensor 28 relative to the floor surface. This further includes the known position, orientation and dimensions of the distance sensors 30 and target mount 58 on stand 24, as well as the configuration of the calibration targets 26 themselves.

Figure 10A:
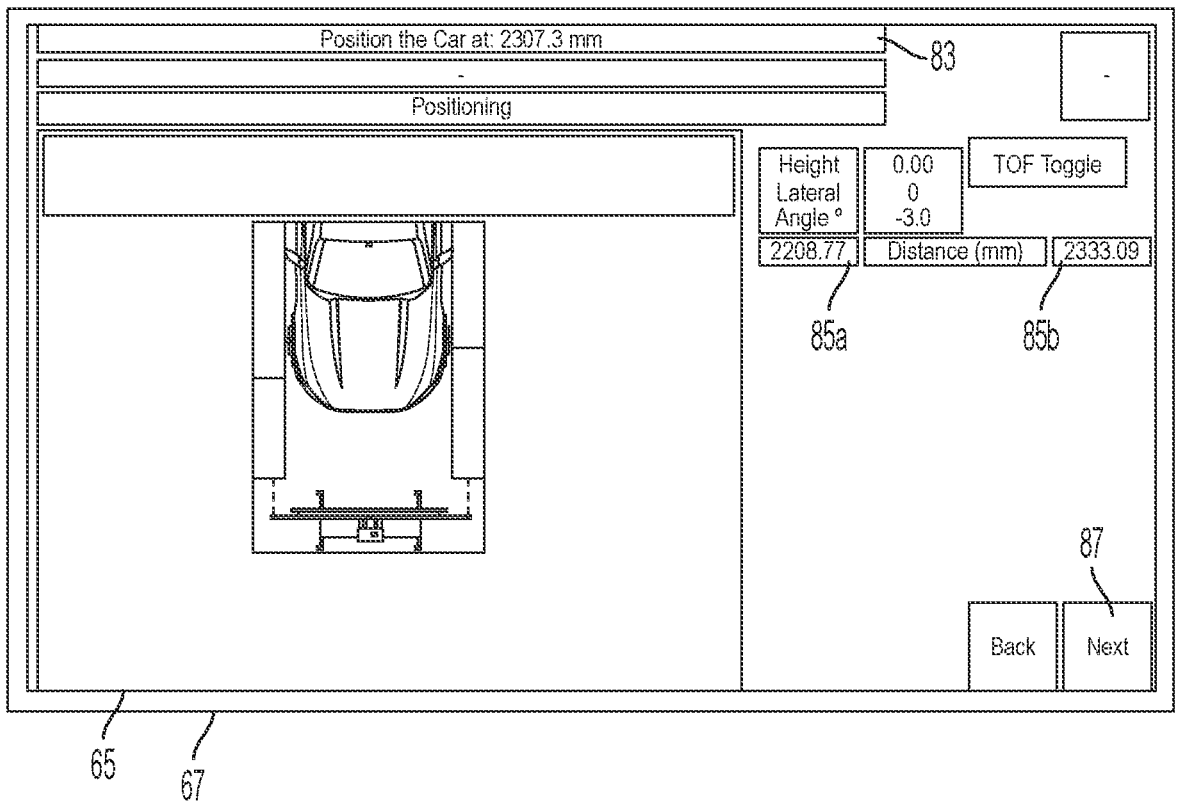
FIGS. 10A and 10B are screen views of an operational program used to align the target adjustment stand relative to the vehicle illustrating longitudinal adjustment steps.
Figure 10B:
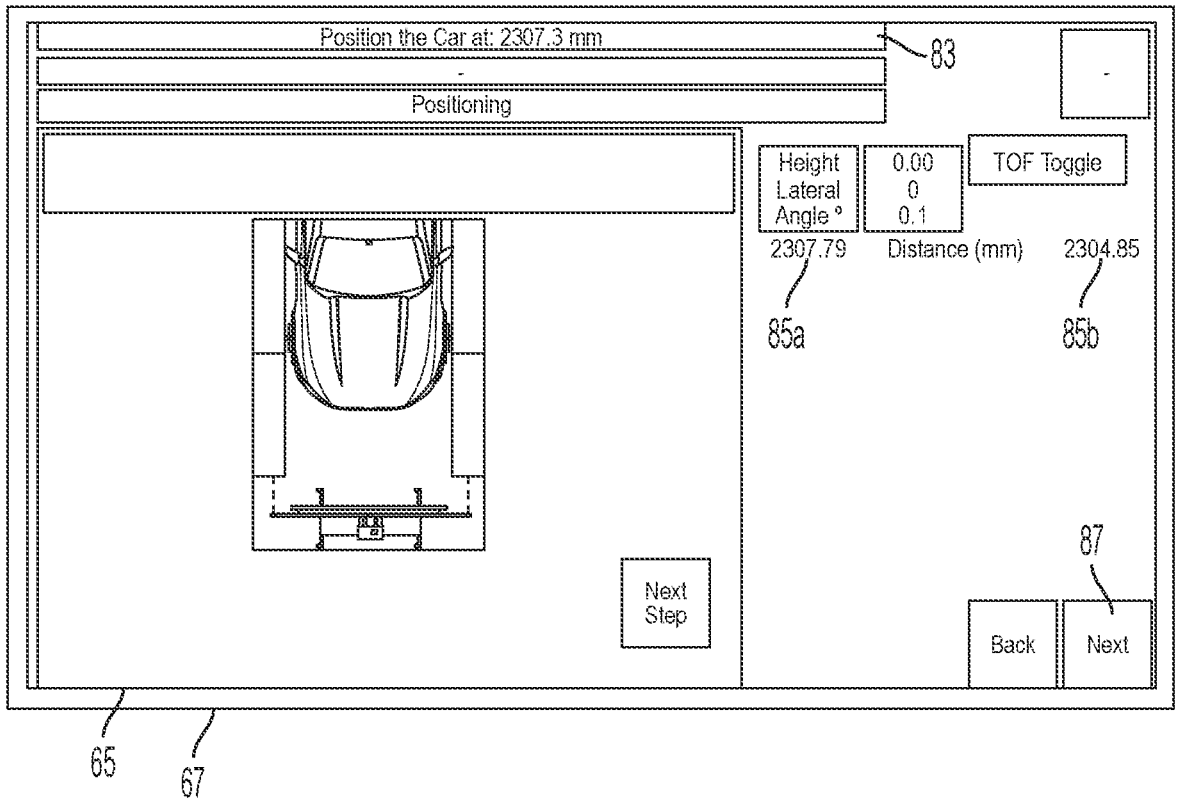

System 20 may, for example, provide the display screen 65 illustrated in FIG. 10A after identification of vehicle 22, and after the operator has placed the wheel targets 25a, 25b as shown in FIGS. 3-4 and has initially oriented stand 24 as shown in FIG. 5 such that distance information from sensors 30 is provided. As shown on the display screen 65, a displayed image may be included, such as the overhead image shown, of the target stand and vehicle for aiding the operator in setting up the system 20. As there shown, a desired longitudinal distance 83 is provided as an instruction to the operator, along with the actual longitudinal distances 85a, 85b for each of the two wheel targets 25a, 25b as measured via distance sensors 30. The operator is able to manually adjust stand 24 to an acceptable initial or rough position while monitoring the actual longitudinal distances 85a, 85b on display screen 65. The acceptable initial position may be based on predetermined limits within the program of system 20, such as a predetermined plus or minus range for each of the actual longitudinal distances 85a, 85b from the desired longitudinal distance 83. FIG. 10B illustrates display screen 65 upon the operator positioning stand 24 into an acceptable initial position. For example, as shown, the program of system 20 may notify the operator when stand 24 is in an acceptable initial longitudinal position, such as by providing a signal to the operator via the display screen 65, where in the illustrated embodiment the signal is configured as a change in the appearance of the display screen 65. Although illustrated as a change in color, alternative notifications may be provided, such as a popup display or notification. Upon obtaining this acceptable initial position, the operator may hit the next button 87 on display screen 65, which in the illustrated embodiment is a touch screen.

Figure 11A:
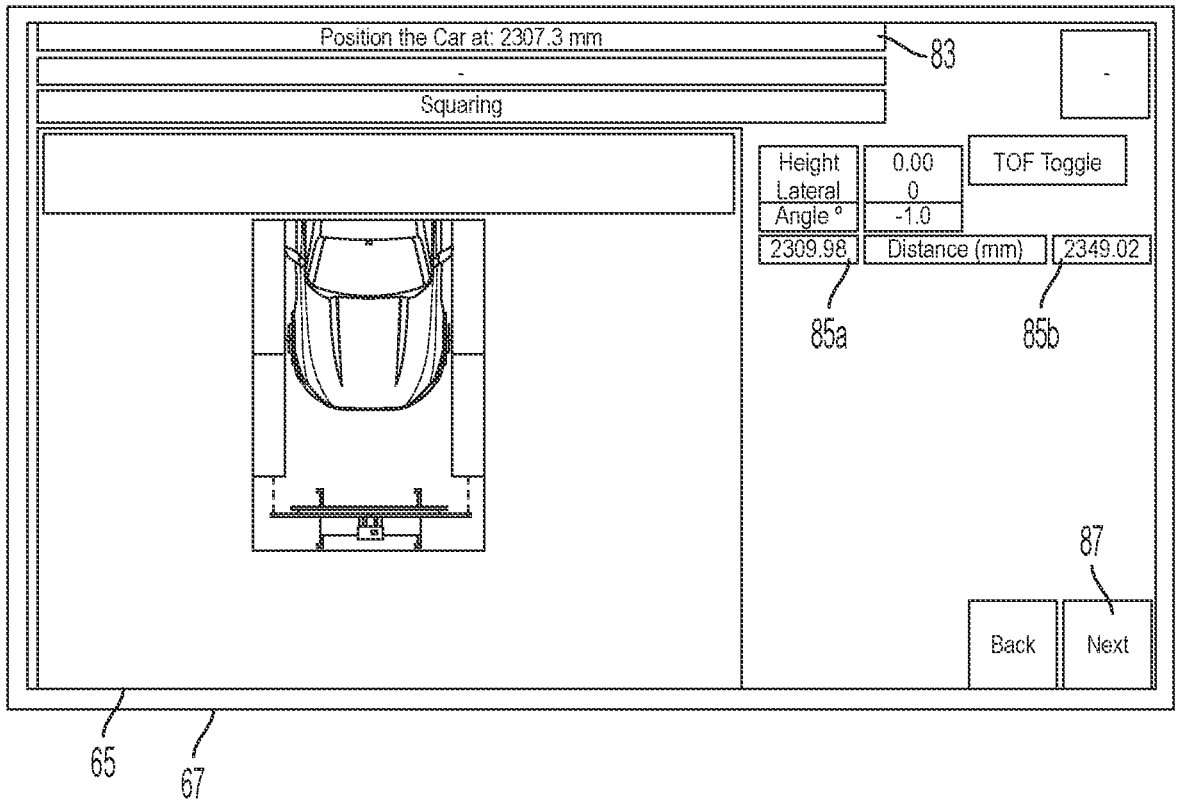
FIGS. 11A and 11B are screen views of the operational program used to align the target adjustment stand relative to the vehicle illustrating yaw adjustment steps.
Figure 11B:
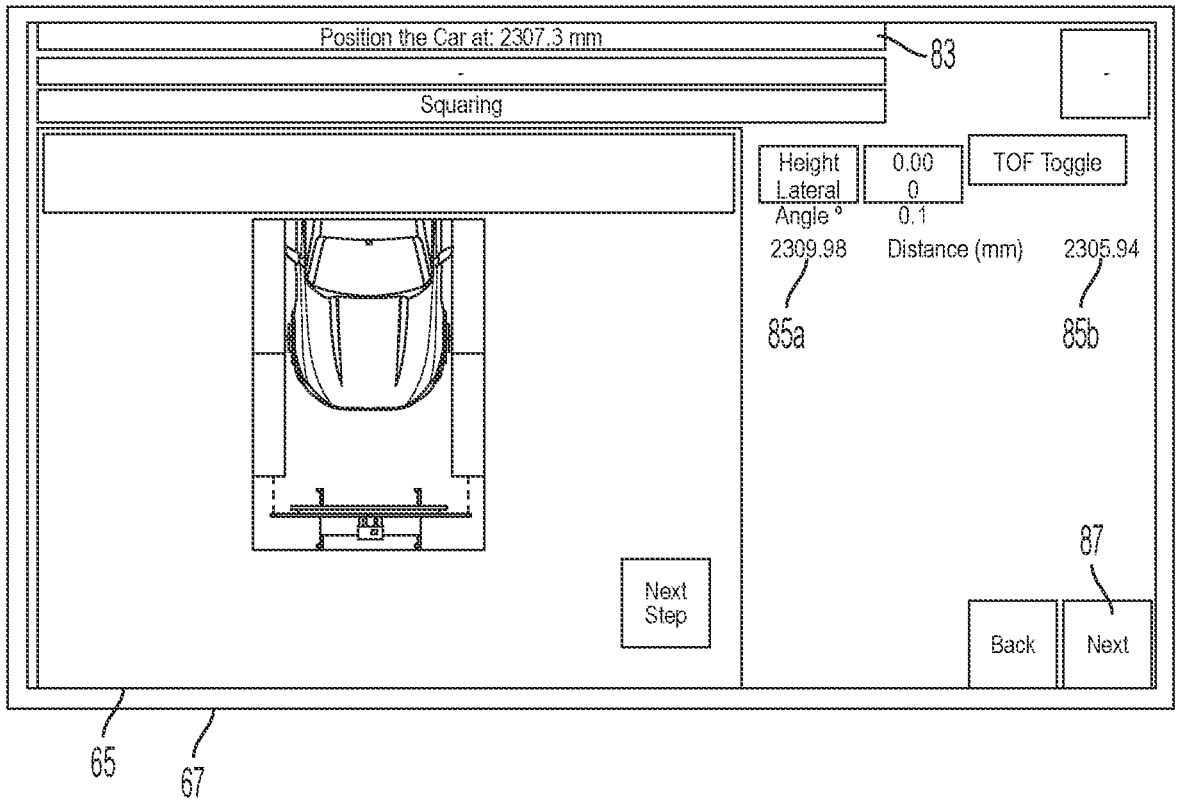

Next, the operator may adjust the yaw of tower assembly 46 relative to vehicle 22 by rotating the tower assembly 46 about the vertical axis by way of switch 76 and actuator 64 while again monitoring the actual longitudinal distances 85a, 85b. This squaring step is illustrated in FIGS. 11A and 11B. Upon rotating the tower assembly 46 such that the actual longitudinal distances 85a, 85b are within a predetermined range or limit of each other and both within a predetermined range or limit of the desired longitudinal distance 83, the program of system 20 may again provide a signal to the operator via the display screen 65, such as by a change in the appearance of the display screen 65 or a pop-up notification. The operator may then hit the next button 87.

The operator may then proceed to laterally adjust the position of the target mount 58 by manually sliding the target mount while monitoring the projected light 77 relative to the center of the vehicle 22, as discussed above. The instructions for this procedure may be provided by the program of system 20 and appear on the display screen 65, with the operator again hitting the next button 87 upon properly centering the target mount 58 and locking it in place, as discussed above.

Figure 12A:
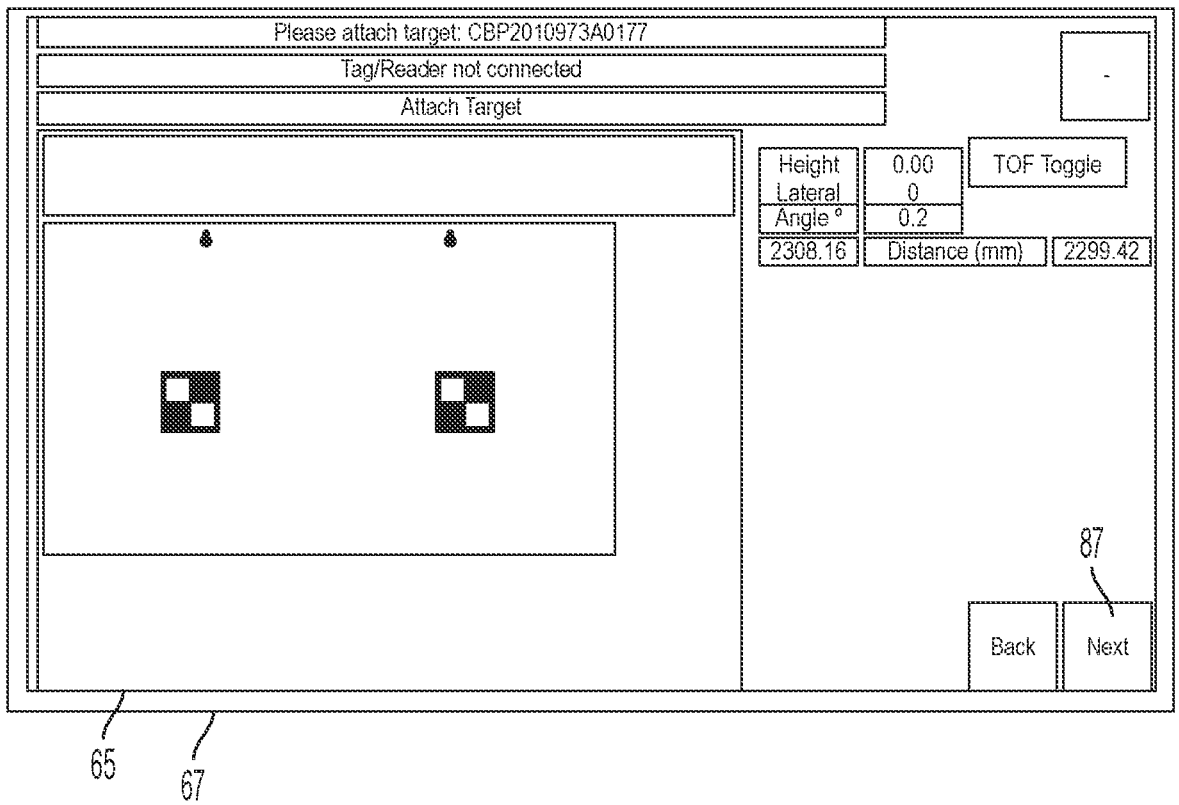
FIGS. 12A and 12B are screen views of the operational program used to align the target adjustment stand relative to the vehicle illustrating target attachment and adjustment steps.
Figure 12B:
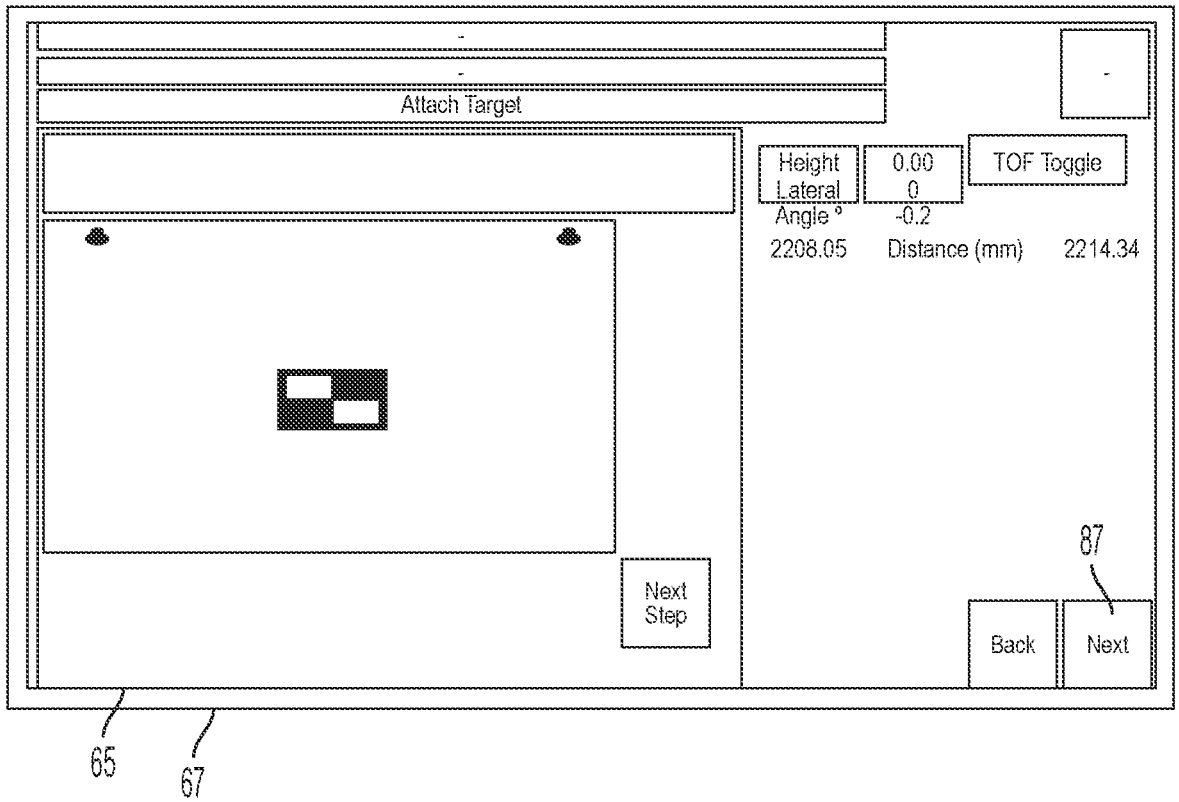

The program of system 20 may then instruct the operator which calibration target 26 to select for mounting to the target mount 58, as illustrated in FIGS. 12A and 12B. As discussed above, the system 20 may require confirmation of selection of the correct calibration target 26, such as by way of RFID tag reading confirmation. The program of system 20 may then instruct the operator as to the correct vertical height to which the target mount 58 is to be positioned by way of the actuator 54 and switches 81. The desired and actual vertical heights may be displayed on display screen 65, where the actual height may be obtained via the height sensor 82 discussed above, and/or based on the known dimensions of stand 24 and the controlled movement of actuator 54. A signal may again be provided to the operator upon obtaining the desired height, with the operator subsequently hitting the next button 87. The program of system 20 may then instruct the operator to run the calibration sequence.

In the illustrated embodiment information regarding the actual longitudinal distances 85a, 85b from distance sensors 30 and information from the vertical height of target mount 58 from height sensor 82 may be provided to portable computer 67, such as via a wireless connection.

Figure 13:
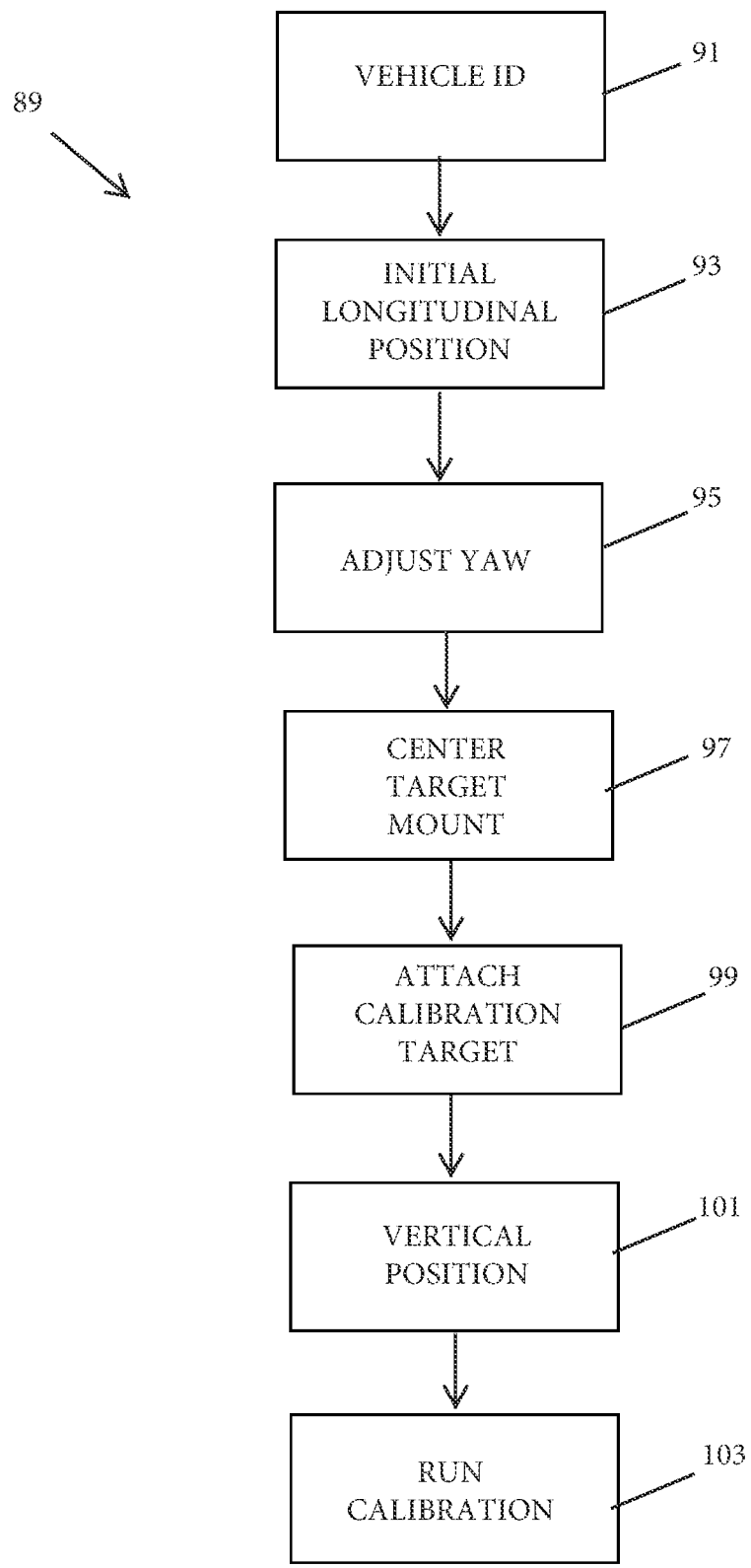
FIG. 13 is a schematic illustration of an exemplary computer control program of the vehicle target alignment system in accordance with the present invention.

An exemplary embodiment of a control program 89 of system 20 is disclosed in FIG. 13, such as may be run on portable computer device a separate computer. As shown in FIG. 13, program 89 includes the steps of vehicle identification 91, initial longitudinal stand positioning 93, yaw adjustment 95, lateral centering 97, calibration target attachment 99, vertical calibration target positioning 101, and vehicle sensor calibration 103.

It should be appreciated that alternative structures, techniques, features and methods may be employed for the positioning of the calibration target 26 relative to the vehicle sensor 28 within the scope of the present invention. For example, in the illustrated embodiment portable computer 67 does not control actuators 54 or 64. In an alternative embodiment, however, an operator may be able to control actuators 54 and/or 64 via portable computer 67 via controller 32. Still further, system 20 may be able to perform some operations in an automated manner without input from the operator, such as adjusting the yaw of tower assembly 46 or setting the vertical height of target mount 58.

Still further, the disclosed system and method may be used with alternatively configured target adjustment stands, including for example, instead of distance sensors 30 being mounted to stand 24 as shown in the illustrated embodiment, in an alternative configuration distance sensors may be positioned at, adjacent or on wheel assemblies 27 with spaced apart distance targets being located on stand. Further changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A system for aligning a target to an equipped vehicle for calibration of a sensor on the equipped vehicle, said system comprising:
    a target adjustment stand, said target adjustment stand including a base and a target mount moveably mounted on said target adjustment stand with said target mount configured to support a target, said target adjustment stand further including a plurality of actuators configured to selectively move said target mount relative to said base;
    a pair of distance targets and a pair of distance sensors, wherein said distance sensors and said distance targets are configured for use in measuring the distances between respective ones of aligned said distance targets and said distance sensors; and
    wherein said distance sensors and said distance targets are arranged for measuring the distances from said target adjustment stand to either side of a vehicle with said distance sensors configured to measure the distance to said distance targets while the vehicle is stationary and said target adjustment stand is disposed so as to be intersected by the longitudinal axis of the vehicle, and wherein the measured distances are used to adjust the position of said target mount;
    wherein said distance sensors are mounted to said target adjustment stand so as to be spaced apart from each other, and wherein said distance targets are positioned on either side of the vehicle, wherein said distance targets comprise a pair of wheel targets at opposed wheel assemblies of the vehicle, and wherein each said wheel target comprises a panel at which respective ones of said distance sensors are directed such that the distances from said target adjustment stand to either side of the vehicle comprise distances from said distance sensors to either side of the opposed wheel assemblies of the vehicle.

2. The system of claim 1, wherein said distance sensors are time of flight sensors.

3. The system of claim 1, wherein said target adjustment stand comprises an upright tower to which said target mount is movably affixed, and wherein one of said plurality of actuators comprises a yaw actuator for selectively rotating said tower relative to said base, and wherein said distance sensors are mounted to said tower for rotation therewith.

4. The system of claim 3, wherein said distance sensors are mounted to arms extending outwardly in opposed directions from said tower.

5. The system of claim 4, wherein said arms are retractable so as to be selectively positionable between an extended position when in use and a retracted upright position.

6. The system of claim 1, wherein said wheel targets comprise a frame for placing on a floor surface adjacent the wheel assemblies, and wherein each said wheel target comprises a light projector for aligning said wheel target with a respective wheel assembly.

7. The system of claim 1, wherein said wheel targets comprise wheel clamps for securing to the wheel assemblies, and wherein said panels of said wheel targets are oriented perpendicular to the wheel assemblies when said wheel clamps are secured to the wheel assemblies.

8. The system of claim 1, further comprising a computer having a display, wherein said computer is configured to display measured distances from said target adjustment stand to either side of the vehicle between respective ones of aligned said distance targets and said distance sensors.

9. The system of claim 8, wherein one of said actuators comprises a vertical actuator for selectively vertically moving said target mount and another of said actuators comprises a yaw actuator for selectively rotating said target mount about a vertical axis, and wherein said yaw actuator and/or said vertical actuator are configured to be actuated by an operator to adjust the position of said target mount based on measured distances displayed on said computer.

10. The system of claim 9, wherein said target adjustment stand further comprises a height sensor for measuring the vertical position of said target mount, and wherein said computer is configured to display vertical position distances measured with said height sensor.

11. The system of claim 1, wherein said target mount includes a light projector configured to project an indicating line, and wherein said target mount is horizontally moveable relative to said base and wherein said indicating light is configured for use in laterally positioning said target mount relative to the vehicle while said base is stationary.

12. The system of claim 1, wherein said target adjustment stand includes a rail to which said target mount is movably attached and includes a tower to which said rail is movably attached, and wherein said target mount is laterally moveable along said rail and said rail is vertically moveable along said tower, and wherein said tower is rotatably attached to said base whereby said tower is configured to rotate about a vertical axis.

13. The system of claim 12, wherein said rail is rotatable between a horizontal in use orientation and a vertical storage orientation.

14. The system of claim 1, wherein said base includes wheels for movement of said target adjustment stand on a supporting surface.

15. A system for aligning a target to an equipped vehicle for calibration of a sensor on the equipped vehicle, said system comprising:
    a target adjustment stand, said target adjustment stand including a base and a target mount moveably mounted on said target adjustment stand with said target mount configured to support a target, said target adjustment stand further including a plurality of actuators configured to selectively move said target mount relative to said base;

a pair of distance targets and a pair of distance sensors, wherein said distance sensors and said distance targets are configured for use in measuring the distances between respective ones of aligned said distance targets and said distance sensors; and wherein said distance sensors and said distance targets are arranged for measuring the distances from said target adjustment stand to either side of a vehicle with said distance sensors configured to measure the distance to said distance targets while the vehicle is stationary and said target adjustment stand is disposed so as to be intersected by the longitudinal axis of the vehicle, and wherein the measured distances are used to adjust the position of said target mount, wherein said distance sensors are mounted to said target adjustment stand so as to be spaced apart from each other, and wherein said distance targets are positioned on either side of the vehicle; and wherein said target adjustment stand comprises an upright tower to which said target mount is movably affixed, and wherein one of said plurality of actuators comprises a yaw actuator for selectively rotating said tower relative to said base, and wherein said distance sensors are mounted to said tower for rotation therewith, and wherein the distances from said target adjustment stand to either side of the vehicle comprise distances from said target stand to either side of a pair of opposed wheel assemblies of the vehicle, and wherein said distance targets comprise a pair of wheel targets configured for positioning at the pair of opposed wheel assemblies of a vehicle, and wherein each said wheel target comprises a panel at which respective ones of said distance sensors are directed such that the distances from said target adjustment stand to either side of the vehicle comprise distances from said distance sensors to either side of the pair of opposed wheel assemblies of the vehicle.

16. The system of claim 15, further comprising a computer having a display, wherein said computer is configured to display measured distances from said target adjustment stand to either side of the vehicle between respective ones of aligned said distance targets and said distance sensors; and wherein one of said actuators comprises a vertical actuator for selectively vertically moving said target mount and another of said actuators comprises a yaw actuator for selectively rotating said target mount about a vertical axis, and wherein said yaw actuator and/or said vertical actuator are configured to be actuated by an operator to adjust the position of said target mount based on measured distances displayed on said computer; and wherein said target adjustment stand further comprises a height sensor for measuring the vertical position of said target mount, and wherein said computer is configured to display vertical position distances measured with said height sensor.

17. The system of claim 16, wherein said target mount includes a light projector configured to project an indicating line, and wherein said target mount is horizontally and vertically moveable relative to said base and wherein said indicating light is configured for use in laterally or vertically positioning said target mount relative to the vehicle while said base is stationary.

18. A method of aligning a target to an equipped vehicle for calibration of a sensor on the equipped vehicle, said method comprising:

moving a target adjustment stand having a base and a target mount moveably mounted on the target adjustment stand relative to the vehicle while measuring distances between the target adjustment stand and a pair of distance targets, wherein the target adjustment stand comprises a pair of distance sensors configured to measure the distances from the distance sensors to the distance targets while the vehicle is stationary and the target adjustment stand is disposed so as to be intersected by the longitudinal axis of the vehicle, and wherein the distance targets comprise wheel targets disposed at opposed wheel assemblies of the vehicle at which the distance sensors are directed, wherein each said wheel target comprises a panel at which respective ones of said distance sensors are directed such that the distances from said target adjustment stand to either side of the vehicle comprise distances from said distance sensors to either side of the opposed wheel assemblies of the vehicle;

rotating the target mount relative to the base while measuring distances between the target adjustment stand and the distance targets;

placing a calibration target on the target mount;

moving the target mount vertically if needed; and laterally moving the target mount relative to the base if needed to center the target mount to the vehicle;

wherein said target adjustment stand includes a tower to which said target mount is movably attached, and wherein said target mount is vertically and laterally moveable on said tower, and wherein said tower is rotatably attached to said base whereby said tower is configured to rotate about a vertical axis.

19. The method of claim 18, wherein the sensor of the vehicle comprises a sensor mounted on or near the interior surface of a windshield of the vehicle.

20. The system of claim 15, wherein said distance sensors comprise time of flight sensors.

* * * * *

UNITED STATES PATENT AND TRADEMARK OFFICE
CERTIFICATE OF CORRECTION

PATENT NO. : 12,172,654 B2
APPLICATION NO. : 17/587668
DATED : December 24, 2024
INVENTOR(S) : Ryan M. Jefferies et al.

Page 1 of 1

It is certified that error appears in the above-identified patent and that said Letters Patent is hereby corrected as shown below:

In the Claims

Column 11
Line 49, Claim 1, "cither" should be --either--

Signed and Sealed this
Fifteenth Day of April, 2025

Coke Morgan Stewart
*Acting Director of the United States Patent and Trademark Office*